(12) United States Patent
Yagi et al.

(10) Patent No.: US 7,479,169 B2
(45) Date of Patent: Jan. 20, 2009

(54) GAS SUPPLYING SYSTEM AND GAS SUPPLYING METHOD

(75) Inventors: Katsuki Yagi, Hiroshima (JP); Shigeru Nojima, Hiroshima (JP); Hirohisa Yoshida, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 488 days.

(21) Appl. No.: 11/186,899

(22) Filed: Jul. 22, 2005

(65) Prior Publication Data

US 2006/0019134 A1    Jan. 26, 2006

(30) Foreign Application Priority Data

Jul. 23, 2004    (JP) .............................. 2004-215225

(51) Int. Cl.
*B01J 7/00* (2006.01)
*B01J 8/00* (2006.01)
*F01N 1/00* (2006.01)
*G05D 16/00* (2006.01)

(52) U.S. Cl. .......................... 48/61; 48/127.9; 48/190; 48/191; 48/197 R; 422/105; 422/112; 429/12

(58) Field of Classification Search .................... 48/61, 48/127.9, 190, 191, 197 R; 422/105, 112; 429/112

See application file for complete search history.

(56) References Cited

U.S. PATENT DOCUMENTS

| 4,098,960 | A | * | 7/1978 | Gagnon | .......................... 429/25 |
|---|---|---|---|---|---|
| 5,030,661 | A | * | 7/1991 | Lywood | ....................... 518/704 |
| 5,993,984 | A |   | 11/1999 | Matsumura et al. |   |
| 2004/0023087 | A1 | * | 2/2004 | Redmond | ..................... 429/19 |
| 2005/0115150 | A1 | * | 6/2005 | Ukai et al. | ..................... 48/89 |

FOREIGN PATENT DOCUMENTS

| JP | 8-148166 |   | 6/1996 |
| JP | 8-308587 | A | 11/1996 |
| JP | 11-329472 |   | 11/1999 |
| JP | 2001-112176 | A | 4/2001 |
| JP | 2002-151123 |   | 5/2002 |
| JP | 2002-281568 | A | 9/2002 |

(Continued)

OTHER PUBLICATIONS

Translation of JP-2002-372199, Nishizaki et al.*

*Primary Examiner*—Walter D. Griffin
*Assistant Examiner*—Lessanework T Seifu
(74) *Attorney, Agent, or Firm*—Birch, Stewart, Kolasch & Birch, LLP

(57) ABSTRACT

A gas supplying system for fuel cell includes a reformer generating a reformed gas by reforming a mixed raw material including a fuel and a first water, a piping network distributing the reformed gas to fuel cell systems each of which is installed in different rooms or buildings, a drain recovery unit recovering a water condensed from the reformed gas in the piping network. The piping network has a circulating route. By the circulation route, the reformed gas does not stay in the piping network so that the water condensation in the piping is suppressed. The water in the piping is removed by the drain recovery unit. According to this configuration, the clogging and corrosion of the piping caused by the condensed water is avoided.

35 Claims, 16 Drawing Sheets

FOREIGN PATENT DOCUMENTS

| | | | |
|---|---|---|---|
| JP | 2002-289212 A | 10/2002 | |
| JP | 2002-305009 | 10/2002 | |
| JP | 2002-333207 A | 11/2002 | |
| JP | 2002-372199 | * 12/2002 | |
| JP | 2003-17097 | 1/2003 | |
| JP | 2003-28449 A | 1/2003 | |
| JP | 2004-355838 | 12/2004 | |
| WO | 01/73879 A1 | 10/2001 | |

* cited by examiner

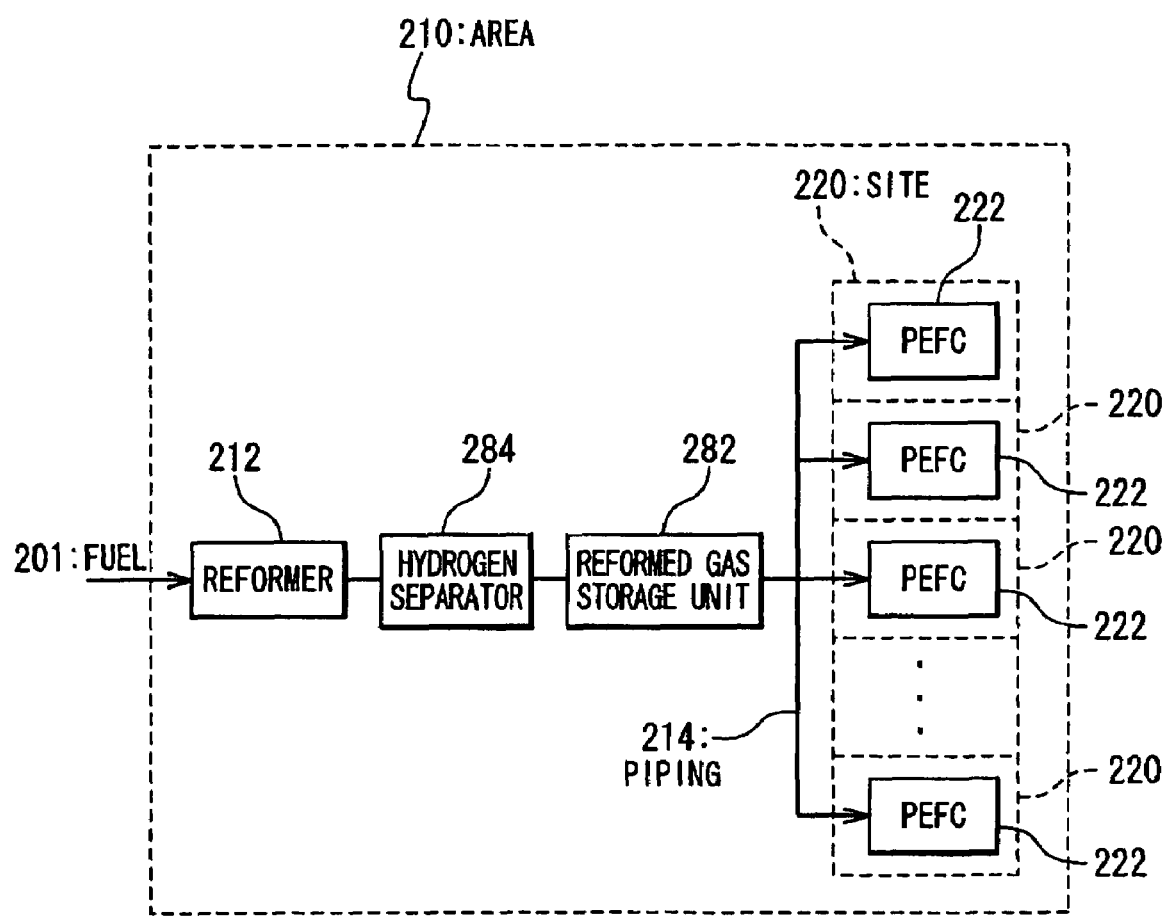

GAS SUPPLYING SYSTEM AND GAS SUPPLYING METHOD

BACKGROUND OF THE INVENTION

1. Field of the Invention

The present invention relates to a gas supplying system and a gas supplying method, and more particularly relates to a gas supplying system and a gas supplying method which supply a reformed gas.

2. Description of the Related Art

Conventionally, a technique which uses a fuel cell as a distributed power source is known. For example, a cogeneration system is considered which uses a polymer electrolyte fuel cell (PEFC) and is jointly installed in a building, such as a typical house, a condominium and a building. In such a cogeneration, a case may be considered in which each of a plurality of PEFCs is distributed and placed for each house, room and floor. In this case, it is required that the individual PEFC is minimized and does not take a large space. To fulfill such requirements, integration of the sharable facilities in the plurality of PEFCs is an effective method.

As the sharable facility, a reformer for reforming a mixed raw material containing fuel and water and then generating a reformed gas can be exemplified. As a conventional method of supplying the reformed gas from the reformer to each of the plurality of PEFCs, a gas supplying method of a one-way traffic (non-circulation) is known. However, when the one-way traffic method is used to supply and distribute the reformed gas, there is a possibility that the water component in the reformed gas is condensed into the pipes of the fuel cell having no demand for the reformed gas in a certain period. A technique for avoiding the blockage and corrosion of the pipes by the water condensation is desired.

When the reformed gas is supplied to each of the plurality of PEFCs, it is important to prevent the supply quantity to all of the PEFCs from being short, irrespectively of the increase or decrease in the usage quantity of the reformed gas in each PEFC. Thus, a technique that makes supply of the reformed gas stable is desired.

As a related technique, Japanese Laid Open Patent Application (JP-A 2003-28449) discloses a system and method for supplying the energy to a community. This system uses an energy generating facility as a core and supplies the generated energy to the houses of the inhabitants in the community. This system includes an energy supply route, an information communication line, a use situation detector, and a managing unit. The energy supply route connects an energy generating facility and the houses of the inhabitants. The information communication line is laid along the energy supply route. The use situation detector is installed for each house and connected to the information communication line and detects the energy use situation in each house. The managing unit collects the detection output from the use situation detector in each house through the information communication line, and levels the usages of the energies in the respective houses, and manages that the usage quantity of the energy in the entire community does not exceed a preset standard.

As the related technique, Japanese Laid Open Patent Application (JP-A 2002-281568) discloses a cogeneration system. This cogeneration system jointly uses the commercial electric power supplied from an electric power company and the electric power generated by a distributed electricity generation apparatus, and on the other hand, uses the waste heat from the dispersed electricity generation apparatus for hot water supply. This has the dispersed electricity generation apparatus, an electric power controller, a gas controller, a warm water storage bath and a system controller. The dispersed electricity generation apparatus uses the gas supplied from a gas company as an energy source. The electric power controller controls the supplies of the electric powers from the dispersed electricity generation apparatus and the commercial electric power. The gas controller controls the supply of the gas from the gas company. The warm water storage bath stores the warm water obtained from the waste heat from the dispersed electricity generation apparatus. The system controller controls the dispersed electricity generation apparatus, the electric power controller and the gas controller.

As the related technique, Japanese Laid Open Patent Application (JP-A-Heisei, 8-308587) discloses a hydrogen supplying facility and a cogeneration system facility. This hydrogen supplying facility includes a culturing unit (7), a culturing temperature keeping mechanism (8) and an organic matter supplying mechanism (18). This culturing unit (7) cultures a hydrogen generation super thermophilic bacteria that generates hydrogen, which is cultured with an organic matter as nutrition, in anaerobic atmosphere having a temperature higher than a room temperature. The culturing temperature keeping mechanism (8) is heated by a waste heat holding medium of 80 degrees centigrade or more, which is exhausted from a waste heat source, and keeps the culturing unit (7) at the temperature suitable for the proliferation of the hydrogen generation super thermophilic bacteria. The organic matter supplying mechanism (18) supplies the organic material required to proliferate the hydrogen generation super thermophilic bacteria into the culturing unit (7). This is designed so as to include a hydrogen storage vessel (14) for extracting the hydrogen generated in the culturing unit (7) with the proliferation of the hydrogen generation super thermophilic bacteria, from the culturing unit (7) and storing therein and so as to enable the hydrogen from being extracted from the hydrogen storage vessel (14).

To achieve high efficiency, various types of cogeneration systems including the fuel cell are considered. As a cogeneration system for supplying the electricity from electricity generation and the heat using waste heat, a system is developed for using an engine or turbine. This system uses the conventional machine whose research has been almost completed. Thus, the durability of an apparatus is excellent, and the facility cost is cheap. Also, a system that has a controller to follow a severe load variation in order to apply to a typical house where a demand for an electric power is greatly varied between day and night is disclosed in Japanese Laid Open Patent Application (JP-A2001-112176).

Also, as the cogeneration system, a system is developed which uses a phosphoric acid fuel cell (PAFC) or a polymer electrolyte fuel cell (PEFC). As for the PAFC, in a case of a continuous operation, the electricity generation efficiency is high such as approximately 40%. However, since the operation temperature is high such as 200 degrees centigrade, trying to carry out a DSS operation for repeating a startup and a shutdown brings about the big drop in performance. On the contrary, the operation temperature of the PEFC is low such as 70 degrees centigrade. Thus, the times necessary for the startup and the shutdown are short. Hence, even in the DSS operation, it is possible to attain the high electricity generation efficiency. Also, a heat storage tank for storing the waste heat of the PEFC in order to enable the use of hot water supply even after the stop of the PEFC operation is disclosed in Japanese Laid Open Patent Application (JP-A 2002-289212) and Japanese Laid Open Patent Application (JP-A 2002-333207).

SUMMARY OF THE INVENTION

Therefore, an object of the present invention is to provide a gas supplying system, an energy supplying system and a gas supplying method, which can stably supply a gas used as a fuel, to all of a plurality of fuel cells which are used in a predetermined region.

Another object of the present invention is to provide a gas supplying system, an energy supplying system and a gas supplying method, which avoid clogging and corrosion to be generated in a pipe for gas supply, when a plurality of fuel cells are used in a predetermined region.

Still another object of the present invention is to provide a gas supplying system, an energy supplying system and a gas supplying method, which can stably operate a common facility and each fuel cell, when a plurality of fuel cells are used in a predetermined region.

According to the present invention, when the plurality of fuel cells are used in a predetermined region, the gas used as fuel can be stably supplied to all of the plurality of fuel cells, and the generation of the clogging and the corrosion in the pipes for supplying gas can be suppressed.

On the other hand, in a cogeneration system, there is a problem that the efficiency of an engine is remarkably dropped at a time of a partial load operation. Also, in the engine, the rate of a heat generation amount to an electricity generation amount is higher than that of the fuel cell. Thus, in the general use field such as the apartment house whose heat demand (hot water supply demand) is lower than the electric power demand and the like, there is a problem that the heat loss becomes great because a large quantity of excessive heat is induced. Also, if the PAFC is continuously operated as the common facility of the apartment houses or as the common facility of the territory where a plurality of houses, offices, hospitals, schools and the like are built, there is a problem that the loss of the energy is enormous because the electricity and heat supplied in the night of low demand is excessive in the typical house, office, hospital, school and the like where the demand is greatly varied between the day and the night. Moreover, if the PEFC and a property reformer are installed in each of each home of the apartment houses, offices, hospitals, schools and the like, those electric power demands are sharply changed. Thus, it is impossible to follow the change in the demand, which results in a problem that the excessive electric power is easily induced.

It is therefore an another object of the present invention to provide a cheap cogeneration system that can protect the generation of excessive electric power and heat, in each home of apartment houses and a territory where a plurality of detached houses, offices, hospitals, schools and the like are built.

According to the present invention, a gas supplying system includes a reformer generating a reformed gas by reforming a mixed raw material including a fuel and a first water, and a piping network distributing the reformed gas to a plurality of fuel cell systems.

According to the present invention, the piping network has a circulating route for distributing the reformed gas to the plurality of fuel cell systems.

By circulating the reformed gas, staying of the reformed gas in the piping network can be avoided so that the condensation of the water in the piping can be avoided.

According to the present invention, the gas supplying system includes a drain recovery unit recovering second water condensed from the reformed gas in the piping network.

By recovering the second water, the clogging or the corrosion caused by the second water condensed in the piping network ca be suppressed so that the reformed gas can be stably supplied to the fuel cell systems.

According to the present invention, the piping network includes: a pump which raise a pressure of the reformed gas supplied from the reformer; an outward piping network which distributes the reformed gas supplied through the pump to the plurality of fuel cell systems; and a homeward piping network which recovers the reformed gas distributed by the outward piping network and circulates the recovered reformed gas to the pump.

By pressurizing the reformed gas after reforming, the carbon conversion rate can be easily controlled to be within a predetermined high level. In addition, the reformed gas can be supplied to the fuel cell systems more stably.

According to the present invention, the outward piping network includes: a plurality of distribution pipes forming a plurality of bifurcations of a distribution route; and a valves respectively inserted in the plurality of distribution pipes and prevent the reformed gas from running reversely.

By setting the check valve as mentioned above, the staying of the reformed gas can be avoided. And it becomes easy to cope with the sharp change of the demand of the reformed gas. As a result, the stable supply of the reformed gas is achieved. And the clogging or the corrosion of the piping can be prevented.

According to the present invention, the outward piping network includes a distribution pipe forming a distribution route without any bifurcation.

Without bifurcation, the flow direction of the reformed gas can be easily controlled to be in one way, so that the staying of the reformed gas is avoided. And it becomes easy to cope with the sharp change of the demand of the reformed gas. As a result, the stable supply of the reformed gas is achieved. And the clogging or the corrosion of the piping can be prevented.

According to the present invention, the distribution route is connected to the drain recovery unit.

By this drain recovery unit, the second water can be recovered efficiently.

According to the present invention, the distribution route slopes to a horizontal plane for the second water flowing towards a portion connecting with the drain recovery unit.

By this drain recovery unit, the second water can be recovered efficiently.

According to the present invention, the gas supplying system includes a controlling unit controlling an operation condition of the reformer, for a pressure of the reformed gas after pressurized by the pump being within a predetermined range.

By controlling the operation condition on the basis of the pressure of the reformed gas after pressurizing, the reformed gas is appropriately supplied even if the operation mode of the fuel cell systems is changed.

According to the present invention, the operation condition includes a flow rate of the mixed raw material supplied to the reformer.

According to the present invention, the controlling unit controls the operation condition for a conversion rate of a carbon in the reformed gas being over a predetermined value.

According to the present invention, the operation condition includes a flow rate of a gas for combustion supplied to the reformer.

According to the present invention, the controlling unit controls a operation condition of the pump so that a pressure of the reformed gas is within a predetermined range and a pressure of the reformed gas after pressurized by the pump is within a predetermined range.

By controlling the pressure of the reformed gas, the pressure in the reformer can be controlled and the carbon conversion rate is controlled to be in a predetermined range. In addition, by controlling the pressure of the reformed gas after pressurizing, it is possible to supply the reformed gas appropriately even if the operation mode of the fuel cell systems is changed.

According to the present invention, the operation condition of the pump includes a revolution speed.

According to the present invention, the piping network includes a plurality of pipes, and at least one of the plurality of pipes has a lowest point where a vertical height is local minimum, and the drain recovery unit is connected in the lowest point.

By this configuration, the second water can be efficiently recovered.

According to the present invention, the gas supplying system includes the plurality of fuel cell systems installed in at least one building.

By this configuration, when a plurality of fuel cell systems is used in a predetermined area, the fuel gas can be stably supplied to the fuel cell systems. At the same time, the clogging or the corrosion in the piping for fuel supply can be avoided and the common facilities and the fuel cell systems can be stably operated.

According to the present invention, the reformer is a common facility of a plurality of sites, and each of the fuel cell systems is installed in one of the plurality of sites and has a heat supplying system for supplying a heat and an electricity supplying system for supplying the electricity.

The site means a unit place where the electricity or the heat is used, exemplified by a segment of the condominium or the apartment house, an independent house, an office, a hospital or a school. The network means the piping for transferring heat of the electric interconnections which connects a plurality of sites each other or between a site and a facility common to the plurality of sites.

The response speed for the change of the load of the reformer is usually slower than thereof the PEFC. Therefore, it is necessary to buy the electricity from the external system if the reformer can not follow the of the load. On the other side, the change rate of the entire electricity demand of the plurality of the sites is the average of the change rate of each of the sites. Therefore the change rate of the entire electricity demand is very relaxed than the individual change rate. According to present invention, the reformer is a facility common to a plurality of sites, so the reformer can be appropriately operated to follow the total electricity demand of the entire sites. Further, because the electricity is produced at the same site where the electricity is demanded, the excessive production of the electricity can be suppressed.

According to the present invention, the gas supplying system includes a catalyst combustor which supplies a heat generated by a catalyst combustion of an off-gas exhausted from the fuel cell systems.

Preferably, the noble metal held by a carrier is used as a combustion catalyst.

The off-gas exhausted from the fuel cell systems includes surplus hydrogen which is not used in the fuel cell systems. This hydrogen is desired to be used validly. However, if the off-gas is burnt by a burner, the stable flame holding is difficult, because the off-gas includes considerable amount of inert gas and moisture. Also, it is difficult to control the air flow rate on the basis of the detected flame temperature because of the change of the flow rate of the surplus hydrogen depending on the electricity production of the fuel cell systems. As a result, there is high possibility of the outranging of the appropriate combustion condition, which causes the flame off. Further, the igniter which is an ignition controlling device can not be constantly operated from the viewpoint of the noise to various apparatuses and the endurance of the members. Then the igniter is started just before the off-gas is reached to the igniter and stopped just after the burner is ignited. But if the starting timing is too late, the ignition causes the explosive burning. If the starting timing is too fast, the off-gas is not ignited. By using catalyst combustion, the burning is automatically started when the off-gas is reached to the combustion catalyst. Therefore the abnormal ignition, flame off or the passing without ignition can be prevented.

According to the present invention, the gas supplying system includes a tank for reserving water heated by a heat supplied by the catalyst combustor.

According to the present invention, the gas supplying system includes a hydrogen separator which extracts a hydrogen component from an off-gas exhausted from the fuel cell systems.

According to the present invention, the hydrogen separator separates the hydrogen component by using a hydrogen separation film.

According to the present invention, the hydrogen separator separates the hydrogen component by using a pressure swing absorption method.

By hydrogen separator, a high concentration hydrogen gas and low concentration hydrogen gas is produced. The high concentration hydrogen gas is supplied to the upstream side of the fuel cell systems as a fuel or to the reformer as a heat medium or to the other fuel cell systems, which causes the recycle of the hydrogen resource and the improve of the entire efficiency. On the other hand, the low concentration hydrogen gas is burnt by the catalyst combustor to produce the demanded heat energy.

According to the present invention, the gas supplying system includes an exhaust heat utilization unit which produces a heat medium having a temperature different from an environment by using an energy obtained by combusting an off-gas exhausted from the fuel cell systems.

According to the present invention, the gas supplying system includes an exhaust heat utilization unit which generates the electricity by using the energy obtained by combusting an off-gas exhausted from the fuel cell systems.

According to the present invention, the gas supplying system includes a mutual supplying network which connects a plurality of selected sites selected from the plurality of sites to supply energy mutually.

According to the present invention, the gas supplying system includes a mutual supplying network, wherein the exhaust heat utilization unit is installed in a first site selected from the plurality of sites, and the mutual supplying network connects the exhaust heat utilization unit and one of the plurality of fuel cell systems installed in a second site to supply energy mutually.

According to the present invention, the gas supplying system includes a mutual supplying network, wherein the exhaust heat utilization unit is installed in a first site selected from the plurality of sites, and the mutual supplying network connects the exhaust heat utilization unit and one of the plurality of fuel cell systems installed in a second site to supply energy mutually.

According to the present invention, the gas supplying system includes a buffer tank inserted between the reformer and each of the plurality of sites for reserving the reformed gas generated by the reformer temporarily.

By installing the buffer tank in the gas piping connecting the reformer and each site, a part of the reformed gas generated by the reformer is temporarily reserved in the buffer tank. The reserved reformed gas is supplied to the entire sites in response to the demand of the reformed gas of the entire sites. This configuration makes it possible to cope with the change of the consumed quantity of the reformed gas of the entire sites. As a result the reformer is operated more safely and efficiently. Further, by installing the hydrogen separator in the gas piping connecting the reformer and the buffer tank, high concentration hydrogen gas is reserved in the buffer tank. As a result, the reserved amount of the hydrogen in the buffer tank is increased, so that the operation of the reformer becomes further stable and the buffer tank can be designed to be compact.

According to the present invention, the gas supplying system includes a hydrogen separator inserted between the reformer and the buffer tank for extracting a hydrogen component from the reformed gas generated by the reformer.

According to the present invention, the gas supplying method includes the steps of (a) generating a reformed gas by reforming a raw material including a fuel and a first water in a reformer; (b) pressurizing the reformed gas; (c) distributing the pressurized reformed gas through an outward piping network to a plurality of fuel cells; (d) recovering the reformed gas which flowed said outward piping network through a homeward piping network; and (e) supplying the recovered reformed gas to the pump.

According to the present invention, the step (a) includes the steps of: (a1) measuring a first pressure of the reformed gas after pressurized by the pump; and (a2) controlling an operation condition of the reformer in response to the first pressure for the first pressure being within a predetermined range.

According to the present invention, the step (a) includes the steps of: (a3) measuring an outlet temperature of reformed gas at an outlet of reforming catalytic layer; and (a4) controlling an operation condition of the reformer in response to the outlet temperature for a conversion rate of carbon in the reformed gas being more than a predetermined value.

According to the present invention, the step (b) includes the steps of: (b1) measuring a third pressure of the reformed gas after pressurized by the pump; and (b2) controlling an operation condition of the pump in response to the third pressure so that a forth pressure of the reformed gas before pressurized is within a predetermined range, and the third pressure is within a predetermined range.

BRIEF DESCRIPTION OF THE DRAWINGS

FIG. 18 is a diagrammatic view showing another embodiment of the system.

DESCRIPTION OF THE PREFERRED EMBODIMENTS

The embodiments of a gas supplying system, an energy supplying system and a gas supplying method of the present invention will be described below with reference to the attached drawings. In this embodiment, the explanation about oxidizing agent gas (for example, oxygen gas or air) supplied to a fuel cell system is omitted.

Figure 1:
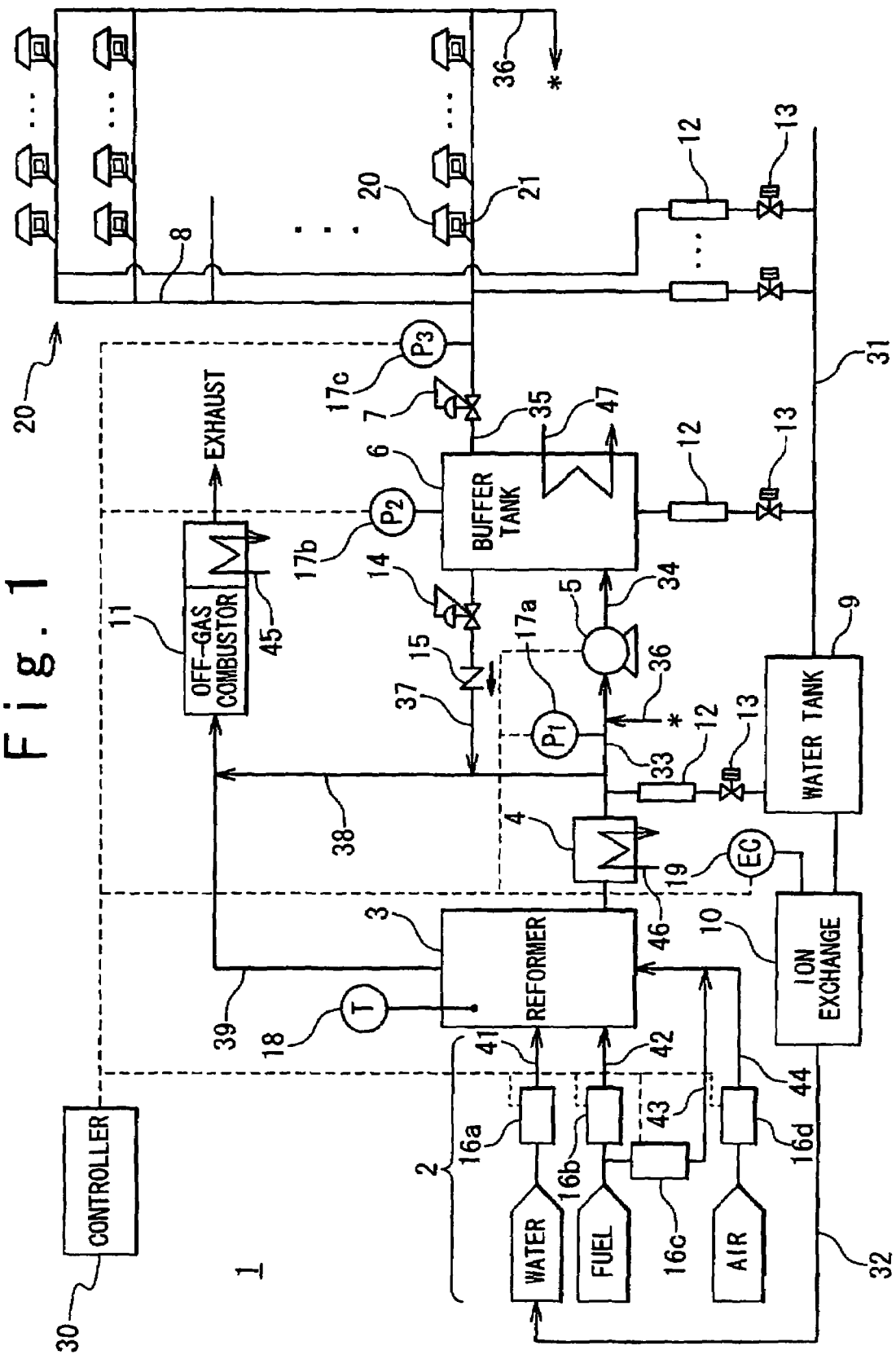
FIG. 1 is a block diagram showing a configuration of an embodiment of the energy supplying system of the present invention.

At first, the configuration of the energy supplying system to which the gas supplying system of the embodiment of the present invention is applied is explained with reference to the attached drawings. FIG. 1 is a block diagram showing the configuration of the embodiment of the energy supplying system of the present invention. The energy supplying system includes a plurality of fuel cell systems 21 and a gas supplying system 1.

Each of the plurality of fuel cell systems 21 receives the supply of reformed gas as fuel gas from the gas supplying system 1 and generates the electric power and heat (water of a high temperature) which are mainly used in the same building 20. The plurality of buildings 20 in FIG. 1 indicate the estate where a plurality of detached houses are gathered. However, they are not limited to this example. For example, the building 20 indicates not only an individual house such as, a condominium, a building and the detached house, but also the region covered by one fuel cell system 21 inside the individual building such as each home in the condominium or one floor in the building.

The gas supplying system 1 includes a gas supplier 2, a reformer 3, a heat exchanger 4, a pressure rising pump 5, a buffer tank 6, a decompressing valve 7, a pipe 8, a water tank 9, an ion exchange processing facility 10, a plurality of drain detectors 12 and drain recovery valves 13, an off-gas combustor 11, a relief valve 14, a check valve 15, a plurality of flow rate adjusters 16 (16a to 16d), a pressure gauge 17a, a pressure gauge 17b, a pressure gauge 17c, a temperature gauge 18, an ion conductivity gauge 19, a controller 30, pipes 31, 32, pipes 33 to 36, pipes 37 to 39, pipes 41 to 44, and heat medium pipes 45 to 47.

The gas supplier 2 supplies water (vapor), fuel (fuel gas) and air to the reformer 3. The water is supplied from a water supplier (not shown) through the pipe 41 to the reformer 3. Its flow rate is adjusted by the flow rate adjuster 16a placed in the course of the pipe 41. The fuel to be reformed to the reformed gas is supplied from its supplier (not shown) through the pipe 42 to the reformer 3. Its flow rate is adjusted by the flow rate adjuster 16b placed in the course of the pipe 42. The fuel to be used for the combustion to generate the enough calorie in the reformer 3 is supplied from its supplier (not shown) through the pipe 43 to the reformer 3. Its flow rate is adjusted by the flow rate adjuster 16c placed in the course of the pipe 43. The air to be used for the combustion to generate the enough calories in the reformer 3 is supplied from its supplier (not shown) through the pipe 44 to the reformer 3. Its flow rate is adjusted by the flow rate adjuster 16d placed in the course of the pipe 44. The flow rate adjusters 16 (16a to 16d) are controlled by the controller 30.

The reformer 3 converts the mixed raw material containing the supplied water and fuel (fuel gas) into the reformed gas containing hydrogen gas through the reforming (vapor reforming, CO shift and CO removal) using catalyst (which forms a reforming catalytic later), and sends the reformed gas to the pipe 33. Methane gas (town gas), propane gas and ethanol are exemplified as the fuel. The outlet temperature of the reformed gas at the outlet of reforming catalytic layer included in the reformer 3 is measured by the temperature gauge 18. Then, the controller 30 adjusts the flow rate adjusting valves 16 (16c, 16d) so that its temperature is in a predetermined range. Setting the outlet temperature within a predetermined range (for example, 650 degrees centigrade or more) is preferred in that a carbon conversion rate can be set within a predetermined range (for example, 90% or more). That is, the hydrogen gas concentration in the reformed gas can be set within a predetermined concentration range. The pressure of the reformer 3 is similar to the ambient air pressure. This is because the carbon conversion rate is dropped if the pressure is raised up. The reformed gas includes hydrogen gas, carbon dioxide and vapor, as the main components.

The heat exchanger 4 carries out the heat exchange between the reformed gas from the reformer 3 and the coolant (for example, cold water) of the heat medium pipe 46 and decreases the temperature of the reformed gas. The cooled reformed gas is sent through the pipe 33 to the pressure rising pump 5. A pressure P1 in the pipe 33 is measured by the pressure gauge 17a.

The pressure rising pump 5 boosts up the pressure of the reformed gas from the pipe 33 and the reformed gas from the pipe 36 joined to the pipe 33 from the pressure P1 and sends through the pipe 34 to the buffer tank 6.

The buffer tank 6 accumulates the pressure-boosted reformed gas. The buffer tank 6 relaxes the sharp change of the demand and supply to reduce the influence on load-following operation of the reformer. A pressure P2 in the buffer tank 6 is measured by the pressure gauge 17b. If the pressure P2 becomes higher than a predetermined pressure, the reformed gas is discharged through the pipes 37, 38 to the off-gas combustor 11 by the actions of the relief valve 14 and check valve 15. The reformed gas of the buffer tank 6 is further cooled by the coolant (for example, the cold water) in the medium pipe 47 with heat exchange. The cooled reformed gas is sent to the pipe 35.

The decompressing valve 7 decompresses the reformed gas of the pressure P2 to a pressure P3. The pressure P3 on the downstream side of the decompressing valve 7 is measured by the pressure gauge 17c. The decompressed reformed gas of the pressure P3 is distributed from the pipe 35 through the pipe 8 to the plurality of fuel cell systems 21. Since the pressure P3 is the pressure relating to the distribution, the decompressing valve 7 usually keeps the pressure P3 constant. The relation of the pressures P1, P2 and P3 is represented by the formula P1<P3<P2.

The drain detector 12 and the drain recovery valve 13 acts together as the drain recovery unit for recovering water component in the pipe. This drain recovery unit sends the water accumulated, for example, in the pipe 8, the buffer tank 6 or the pipe 33, by the condensation of the vapor in the reformed gas to the pipe 31 or water tank 9. At that time, the drain detector 12 reserves the water until the quantity reaches a predetermined quantity. When the predetermined quantity of water is reserved, a signal indicating its fact is outputted to the drain recovery valve 13. The drain recovery valve 13 is controlled to open the valve until a preset quantity of water flows, in response to the signal from the drain detector 12.

The water tank 9 obtains water through the pipe 31 and accumulates the water. The water tank 9 accumulates also the water from the drain recovery unit. The water tank 9 relaxes the sharp change in the demand and supply to reduce the influence on the later stage. The water of the water tank 9 is processed by the ion exchange processing facility 10 so that it has a predetermined purity (ion conductivity). The ion conductivity is measured by the ion conductivity gauge 19. The ion exchange processing facility 10 sends the water through the pipe 32 to the gas supplier 2.

The off-gas combustor 11 burns: the combustion gas resulting from the combustion to generate the enough calorie in the reformer 3; a part of the reformed gas from the pipe 33-pipe 38; and a part of the reformed gas relieved by the relief valve 14 from the pipe 37-pipe 38, and they are made harmless. The burned gas is cooled by the heat exchange with the coolant (for example, cold water) of the heat medium pipe 45. The cooled burned gas is exhausted to the outside.

The controller 30 receives the pressure P2 of the reformed gas after compressed by the pump 5 from the pressure gauge 17b, and controls the operation condition of the reformer 3 so that the pressure P2 is maintained in the predetermined range (for example, P2>P3, wherein P3 is constant). The operation condition includes, for example, the flow rate of the water and fuel that are supplied to the reformer 3 for the reformed gas. In that case, the controller 30 controls the flow rate adjusters 16a, 16b. Also, the controller 30 receives an output temperature T of the reformer 3 from the temperature gauge 18 and controls the operation condition of the reformer 3 so that it becomes the output temperature T where the carbon conversion rate in the reformed gas generated by the reformer 3 is maintained in the predetermined range (for example, 90% or more). The operation condition includes, for example, the flow rate of the fuel and air that are supplied to the reformer 3 for the combustion. In that case, the controller 30 controls the flow rate adjusters 16c, 16d. Moreover, the controller 30 receives the pressure P1 approximately equal to the pressure of the reformed gas of the reformer 3 and controls the operation condition of the pressure rising pump 5 so that the pressure P1 is controlled to be in the predetermined range (for example, atmosphere pressure<P1<P2) and the pressure P2 is controlled to be in the predetermined range (for example, P2>P3). The operation condition includes, for example, a rotation number (or a revolution speed). The controller 30 carries out the control, for example, in accordance with a PID control using a preset gain.

Each of the plurality of fuel cell systems 21 as shown in FIG. 1 may be always operated or may be operated at DSS (Daily Startup and Shutdown). Thus, the individual fuel cell systems are operated in different manners. Therefore, the total amount of the reformed gas used in the plurality of fuel cell systems 21 is changed from hour to hour. When the controller 30 carries out the control to determine the operation values (including the flow rates of the water and fuel, or the quantity of the generated reformed gas based on the flow rates of the water and fuel) in accordance with a certain control value, the sum of current values of the plurality of the fuel cell systems 21 is exemplified as the control value used by the controller 30. The sum of the current values corresponds to the sum of the momentary gas demand quantities. However, since the inner volume of the pipe 8 and the like exists as the buffer, the sum of the current values is not suitably used solely as the control value. For this reason, the generation quantity of the reformed gas in the reformer 3 is preferred to be set by referring to the value of the pressure 3 related to the use quantity and the supply margin. Hence, it is possible to calculate the generation quantity suitable for the use quantity (demand quantity) of the reformed gas. Here, both of the sums of the current values of the plurality of fuel cell systems 21 and the pressures P3 of the pipes can be used together for the control. In this case, controlling can be better as compared with the case of using only the pressure P3.

The heat recovered by the heat medium pipes 45 to 47 can be re-used inside this energy supplying system or outside it.

Figure 2:
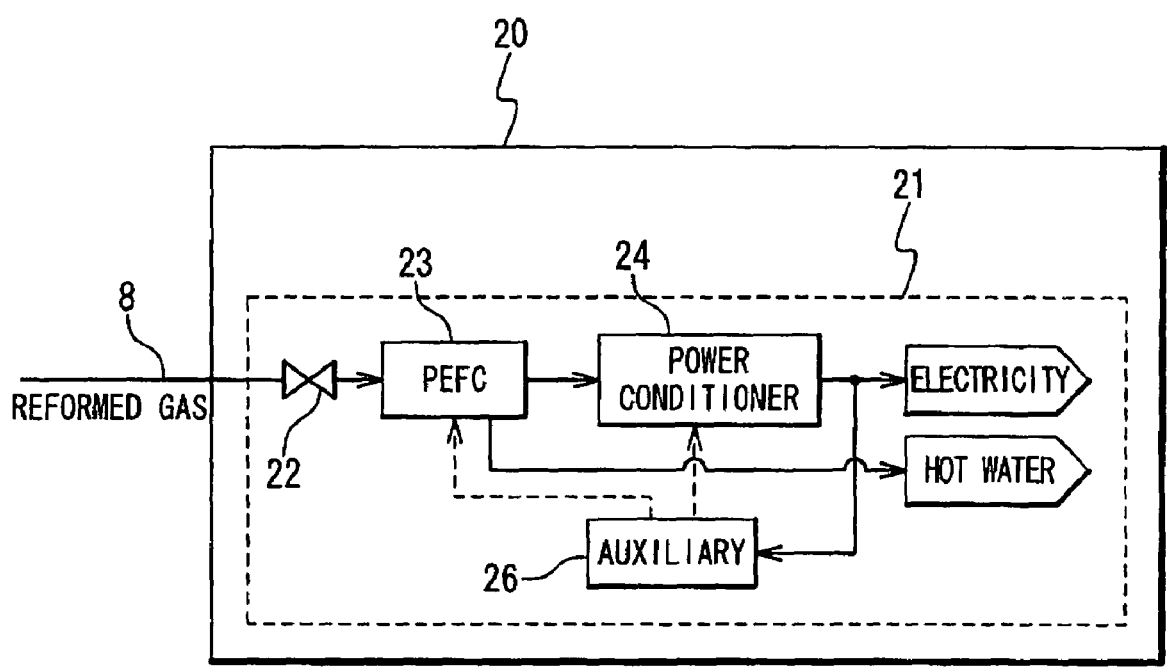
FIG. 2 is a block diagram showing a configuration of a fuel cell system.

FIG. 2 is a block diagram showing an example of the configuration of a fuel cell system 21. The fuel cell system 21 includes a valve 22, a PEFC 23, a power conditioner 24 and an auxiliary 26. The reformed gas and oxidant gas (not shown) such as air are supplied from the pipe 8 through the valve 22 to the PEFC 23, which generates a direct current electric power. The power conditioner 24 converts the generated direct current electric power into the alternating electric power and outputs. The auxiliary 26 is used for the operations of the PEFC 23 and power conditioner 24. The heat generated in the PEFC 23 is used for the hot water supply by the heat exchange with the water.

Figure 3:
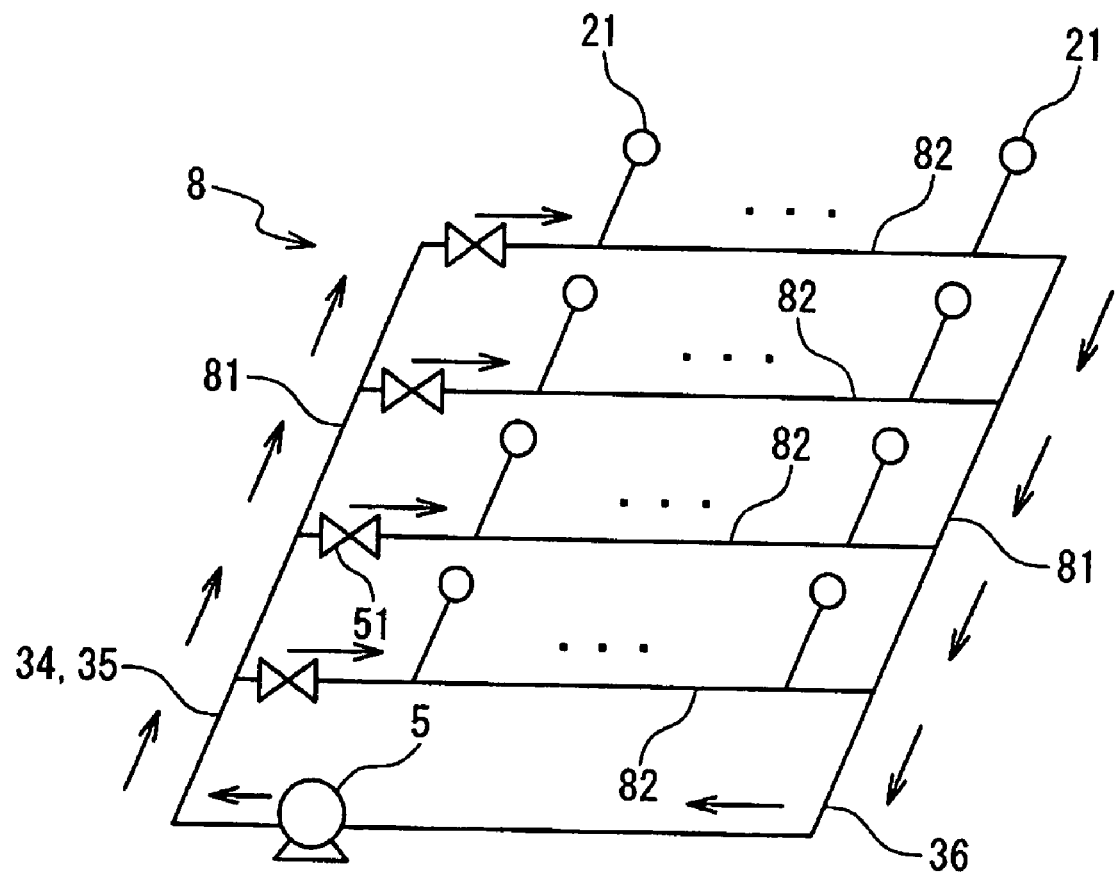
FIG. 3 is a configuration view showing a piping network.

FIG. 3 is a configuration view showing a piping network. The piping network distributes and supplies the reformed gas to the plurality of fuel cell systems 21 connected to the pipe 8. At this time, the reformed gas is always circulated inside the piping network so that the staying of the reformed gas can be avoided. Consequently, it is possible to prevent the reformed gas from staying in the pipe, avoid the water component in the reformed gas from being condensed, and prevent the pipe from being clogged and corrosive. The piping network has the pressure rising pump 5, the pipe 34, the pipe 35, the pipe 8 and the pipe 36.

The reformed gas compressed by the pressure rising pump 5 is supplied to the pipe 8 through the pipes 34, 35. The pipe 8 has a first pipe 81, a plurality of throttle valves 51, and a plurality of second pipes 82 and third pipes 83. The first pipe 81 distributes and supplies the reformed gas supplied from the pipe 35 to the plurality of second pipes 82. The throttle valve 51 and the plurality of fuel cell systems 21 are connected to each of the plurality of second pipes 82. After a predetermined decompression is performed on the reformed gas by the throttle valve 51, the reformed gas flows through the second pipe 82 and arrives at the second pipe 83. A part thereof is supplied in the middle thereof to the fuel cell system 21. The throttle valve 51 is placed such that the flow of the reformed gas is the one-way flow from the first pipe 81 through the second pipe 82 to the third pipe 83. The third pipe 83 receives the reformed gas from the plurality of second pipes 82 and sends to the pipe 36. The pipe 36 circulates the reformed gas to the pressure rising pump 5. The foregoing piping network can prevent the reformed gas from staying in the pipe. Consequently, it is possible to prevent the water component in the reformed gas from being condensed, and avoid the pipe from being clogged and corrosive.

The prevention from the damage caused by the generation of the condensed water is preferred in view of the following points. There is a case that not only the usual operation but also the DSS operation may be performed on the fuel cell system 21. Thus, in particular, the possibility that the condensed water is frozen is assumed. Even in this case, if the condensed water is removed, the trouble can be avoided. The pipe 8 may have a heating facility so that the condensed water is not frozen. A heater wrapped around the pipe is exemplified as such heating facility.

Figure 4:
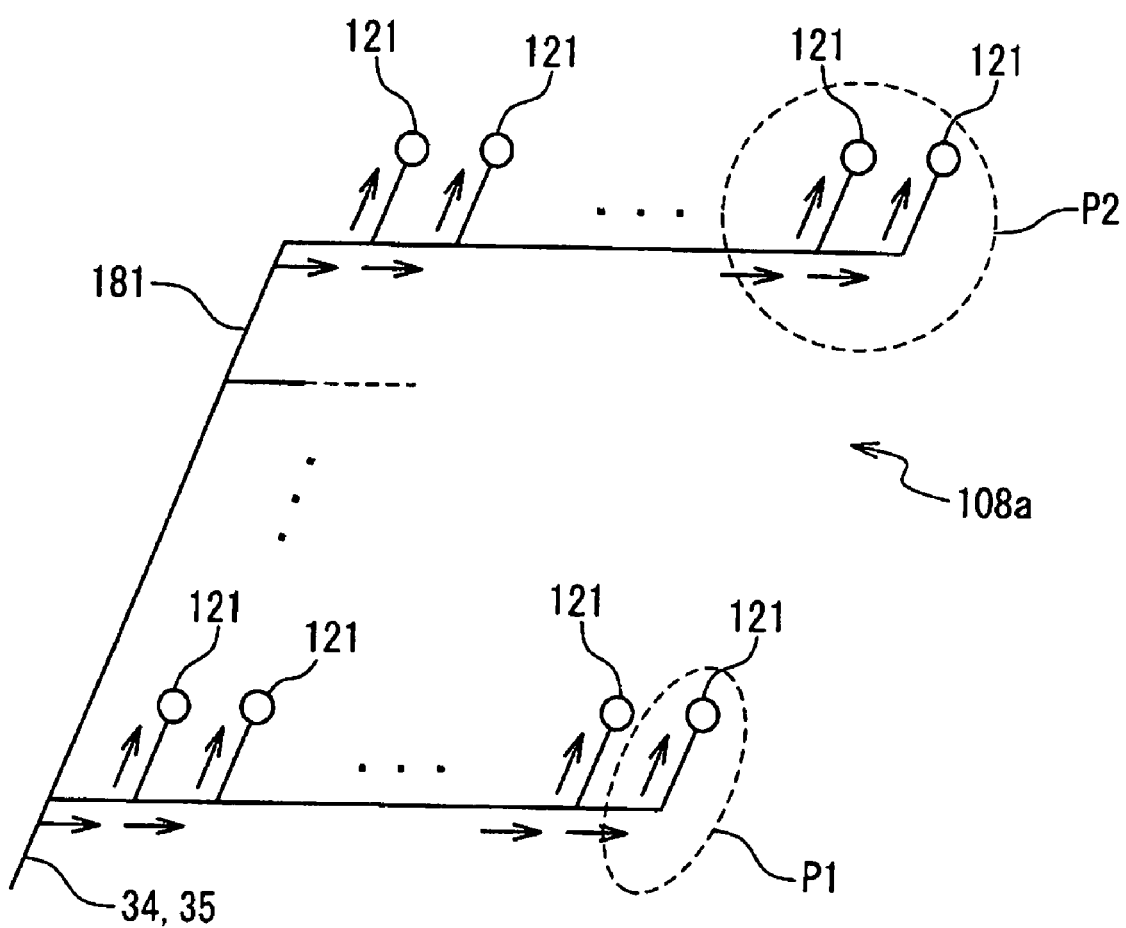
FIG. 4 is a view showing a configuration of a piping where a reformed gas is not circulated.

FIG. 4 is a view showing the configuration of the pipe where the reformed gas is not circulated. In this pipe 108*a*, the reformed gas supplied to a first pipe 181 is distributed and supplied to each of a plurality of second pipes 182. Then, the reformed gas is supplied to a plurality of fuel cell systems 121 connected to each of the second pipes 182. At this time, at the downstream end (P1 and P2 in FIG. 4) of the second pipe 182, the flow speed of the reformed gas becomes low. Thus, it is impossible to cope with the sharp increase in the demand of the reformed gas at the downstream end. In addition, if there is no demand for the reformed gas on the downstream side, the flow of the reformed gas is stopped, which causes the condensed water to easily stay. Hence, the pipe 108*a* in FIG. 4 requires some countermeasure.

Figure 5:
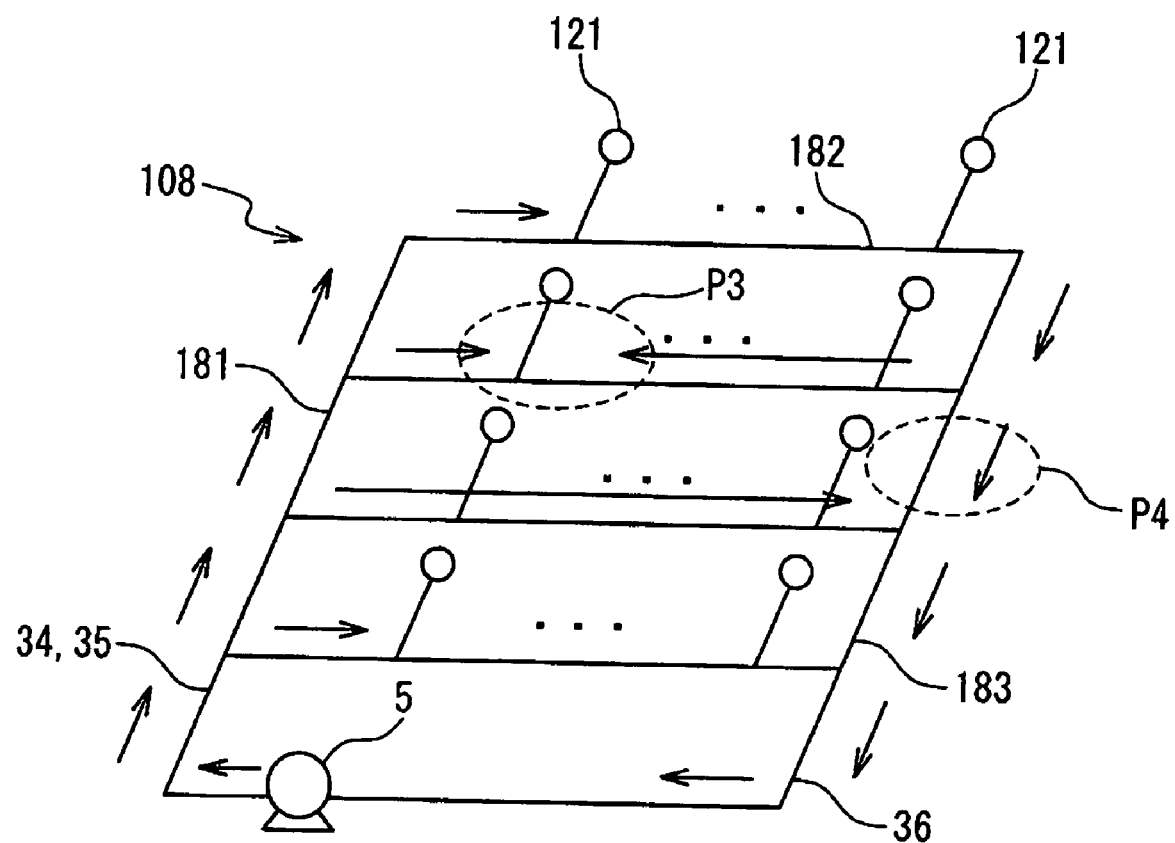
FIG. 5 is a view showing a configuration of a piping where a reformed gas is circulated and a throttle valve is not used.

FIG. 5 is a view showing the configuration of the pipe where the reformed gas is circulated and the throttle valve is not used. In this pipe 108*b*, the reformed gas supplied to the first pipe 181 is distributed and supplied to each of the second pipes 182. Then, the reformed gas is supplied to the plurality of fuel cell systems 121 connected to each of the second pipes 182. After that, it is gathered by the third pipe 83 and circulated through the pipe 36 to the pressure rising pump 5. At this time, when there is not the throttle valve 51, if there is the position (P3 in FIG. 5) having a very large demand for the reformed gas, there is the possibility of the change in the flow direction. In that case, the position (P4 in FIG. 5) where the flow of the reformed gas is very slow or the position where there is no flow exists. If so, the reformed gas stays in the pipe. Thus, the water component in the reformed gas is condensed, which causes the pipe to be clogged and corrosive. Thus, if the demand for the reformed gas is largely different for each of the fuel cell systems, the pipe 108*b* in FIG. 4 requires some countermeasure.

As mentioned above, in the piping network of the reformed gas, the reformed gas is preferred to always flow as shown in FIG. 3. Also, the flow direction is preferred to be always constant. Consequently, the reformed gas can be stably distributed and supplied to the plurality of fuel cell systems 21.

The piping network where the reformed gas always flows and its flow direction is always constant is not limited to the configuration of FIG. 3. For example, the configurations shown in FIGS. 6, 7 are considered.

Figure 6:
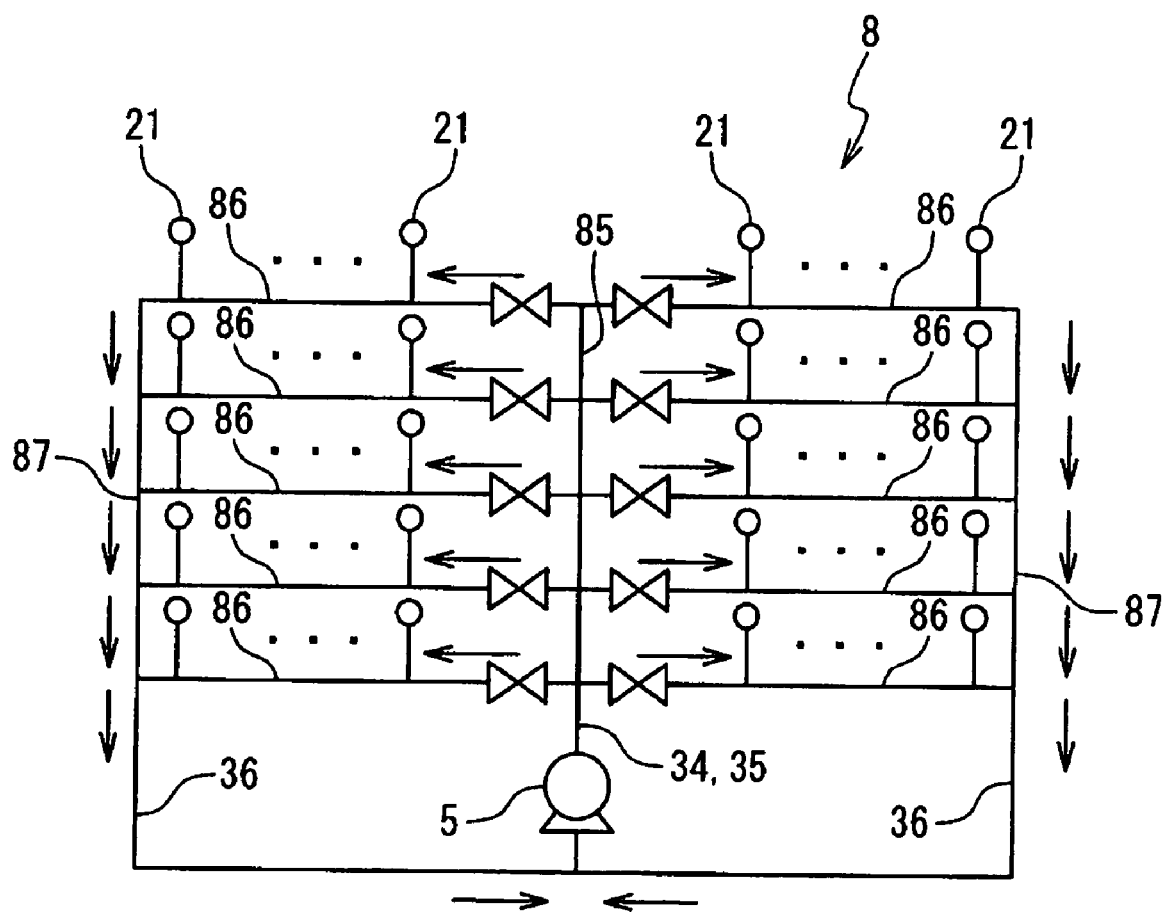
FIG. 6 is a configuration view showing a variation example of a piping network.

FIG. 6 is a configuration view showing a variation example of the piping network. The reformed gas compressed by the pressure rising pump 5 is supplied through the pipe 34 and the pipe 35 to the pipe 8. The reformed gas is distributed and supplied through the first pipe 85 to the plurality of second pipes 86. Here, the configuration is different with the case of FIG. 3 in the point that there are two systems of the plurality of second pipes 86. After the throttle valve 51 performs a predetermined decompression on the reformed gas, the reformed gas flows through the second pipes 86 and arrives at each third pipe 87. A part thereof is supplied from the midstream to the fuel cell system 21. The reformed gas is circulated through the third pipe 87 and the pipe 36 to the pressure rising pump 5. Also in this case, with the piping network, it is possible to prevent the reformed gas from staying in the pipe. Then, it is possible to prevent the water component in the reformed gas from being condensed and to avoid the pipe from being clogged and corrosive. Here, the number of the systems of the plurality of the second pipes 86 is two. The number of the systems may be further increased.

In FIGS. 3, 6, the configuration that the thickness of the pipe is gradually tapered to the side connected to the pipe 36 from the side connected to the pipe 35 without using the throttle valve 51 can be adopted. Consequently, with the throttle valve 51 being omitted, the flow direction of the reformed gas can be made always constant.

Figure 7:
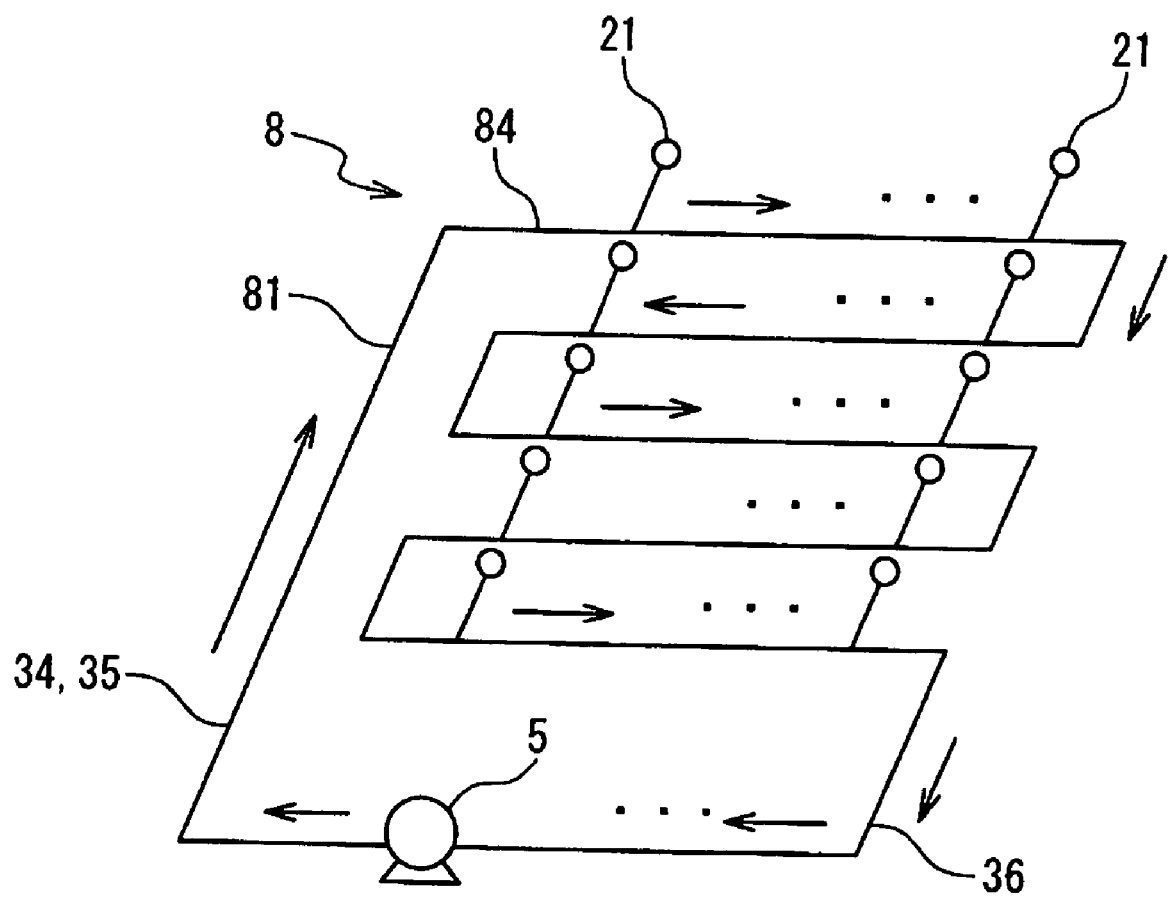
FIG. 7 is a configuration view showing another variation example of a piping network.

FIG. 7 is a configuration view showing another variation example of the piping network. The reformed gas compressed by the pressure rising pump 5 is supplied through the pipe 34 and the pipe 35 to the pipe 8. The reformed gas is distributed and supplied through the first pipe 81 to the second pipe 84. Here, the configuration where the second pipe 84 is only one without any branch and continuously connected to the pipe 86 such as a single stroke manner differs from the case of FIG. 3. With such configuration, the flow direction of the reformed gas can be made always constant, and the throttle valve 51 can be omitted. The reformed gas flows through the second pipe 84 and arrives at each pipe 36. A part thereof is supplied in the midstream to the fuel cell system 21 connected to the second pipe 84. The reformed gas is circulated through the pipe 36 to the pressure rising pump 5. Also in this case, with the piping network, it is possible to prevent the reformed gas from staying in the pipe. Then, it is possible to prevent the water component in the reformed gas from being condensed and to avoid the pipe from being clogged and corrosive.

Figure 8:
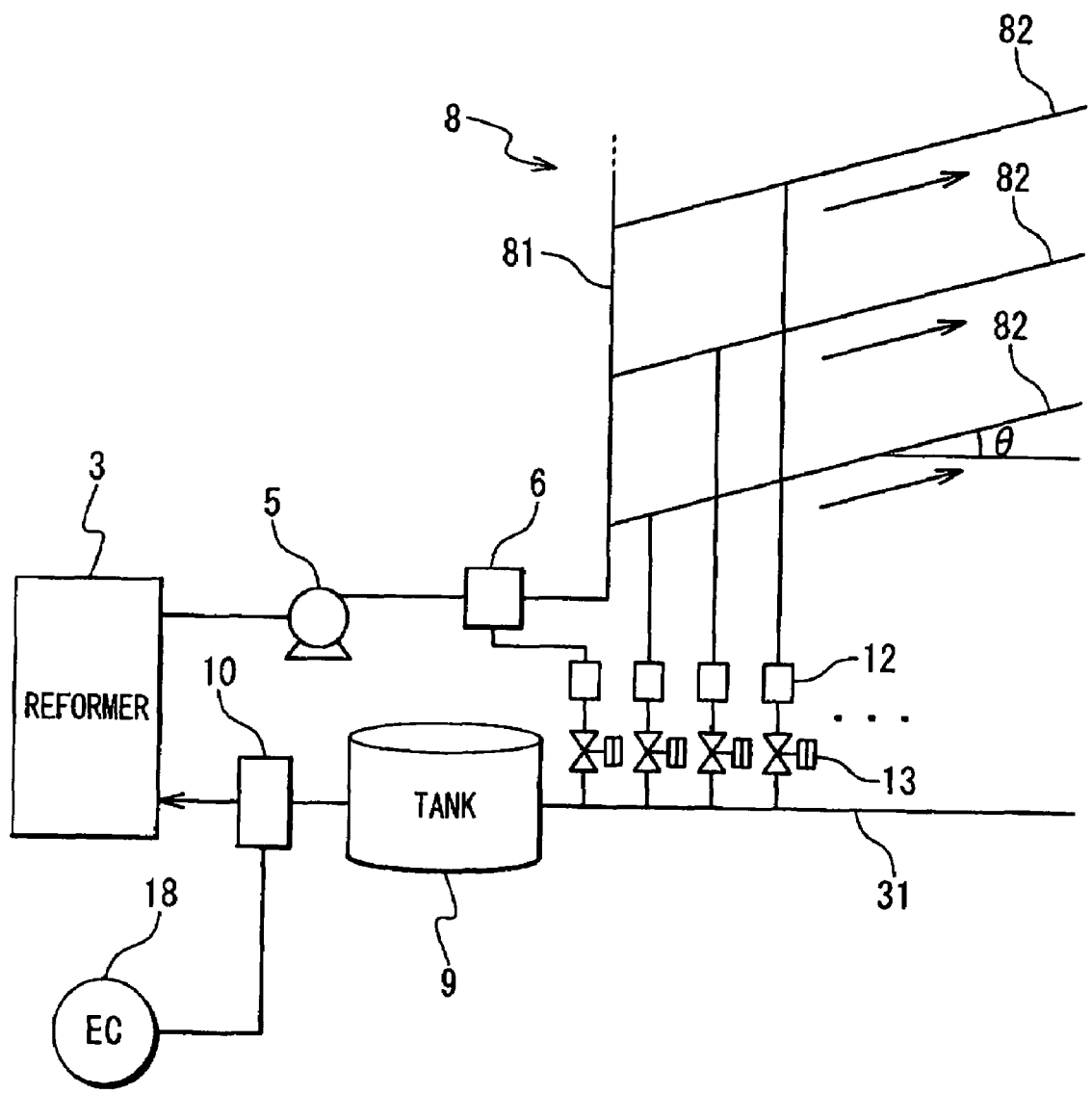
FIG. 8 is a view showing a configuration with regard to a circulation of water.

FIG. 8 is a view showing the configuration with regard to the circulation of water. An example where the pipe 8 in FIG. 3 is used as the pipe 8 in the configuration of FIG. 1 is shown here. The drain recovery unit (including the drain detector 12 and the drain recovery valve 13) for recovering the water component in the reformed gas which has the possibility of being condensed inside the second pipe 82 is connected to the second pipe 82. The second pipe 82 may be inclined towards the drain recovery unit at a predetermined angle theta (indicated by a Greek alphabet) with respect to a horizontal direction as shown in FIG. 8, so that the condensed water easily flows into the drain recovery unit. The water of the drain recovery unit flows into the pipe 31 for supplying the raw material water to the water tank 9 and collected in the water tank 9. The water is re-used as the raw material water by the reformer 3 after the ion conductivity is adjusted. By recovering the water excessive in the process, it is possible to reduce the consumption speed of the heat exchange resin in the ion exchange processing facility 10.

Figure 9:
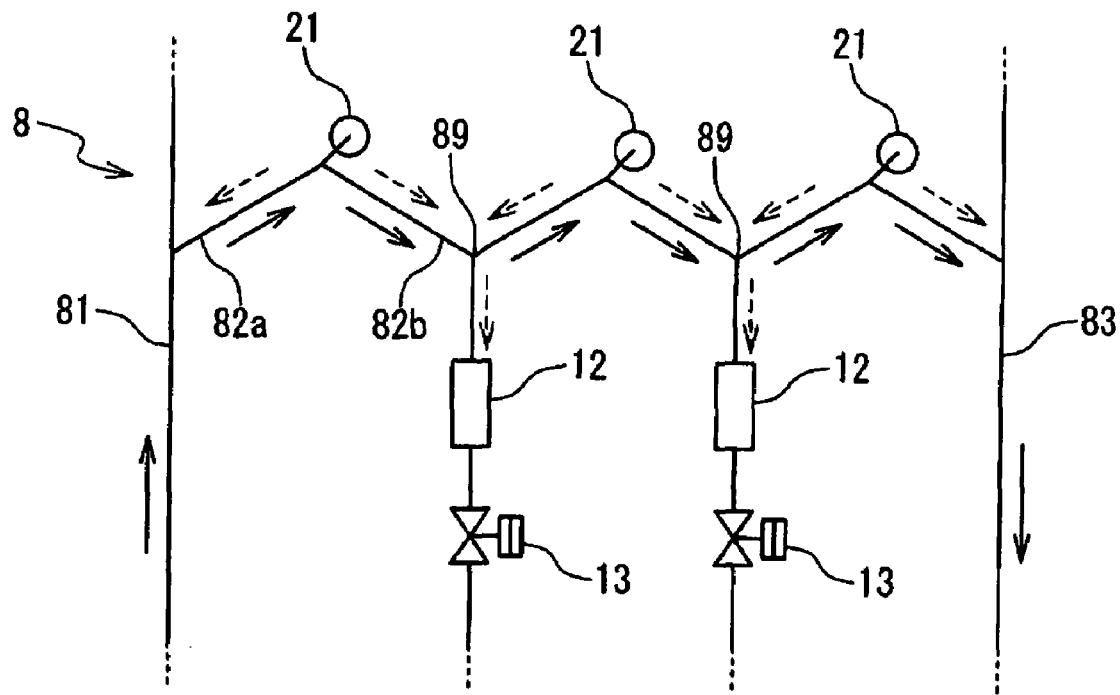
FIG. 9 is a view showing a configuration of a variation example of the second pipe in the piping.

FIG. 9 is a view showing a configuration of a variation example of the second pipe 82 in the pipe 8. Here, this shows an example where the pipe 8 in FIG. 3 is varied as the pipe 8 in the configuration of FIG. 1. The explanation of the throttle valve 51 is omitted. Arrows of dotted lines indicate the flow of the condensed water. Arrows of solid lines indicate the flow of the reformed gas. The drain recovery unit (including the drain detector 12 and the drain recovery valve 13) for recovering the water component in the reformed gas which has possibility to be condensed inside the second pipe 82 is connected to the second pipe 82. The second pipe 82 is inclined in such a way that the connection portion connecting the second pipe 82 with the drain recovery unit is set to be somewhat low compared to the other portion of the second pipe 82 in a vertical direction, so that the condensed water easily flows into the drain recovery unit. That is, the drain recovery unit is connected to the locally lowest point of the second pipe 82, where the vertical height is local minimum. Also, in order to minimize the influence of the condensed water on the fuel cell system 21, the connection portion of the fuel cell system 21 is set to be somewhat high in the vertical direction. That is, the fuel cell system 21 is connected to the locally highest point of the second pipe 82 where the vertical height is local maximum. With such design, while the flow of the reformed gas is kept in one direction, the condensed water can be efficiently removed.

Figure 10:
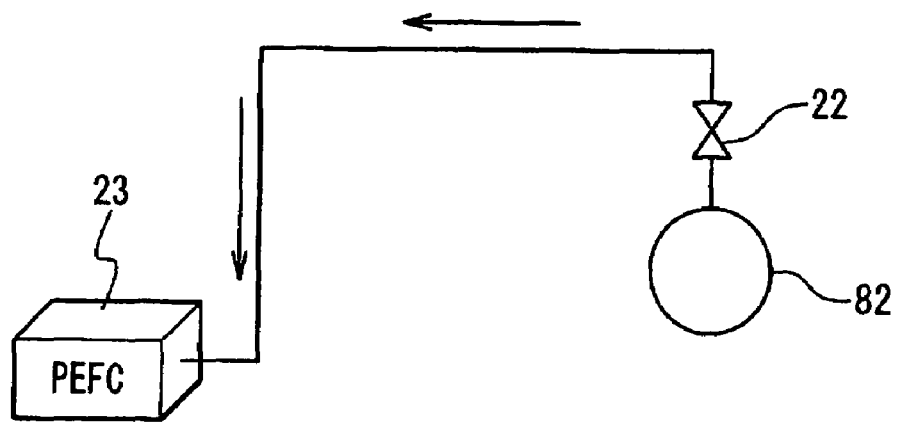
FIG. 10 is a view showing a configuration of a connection portion between the second pipe and the fuel cell system.

FIG. 10 is a view showing the configuration of the connection portion between the second pipe 82 and the fuel cell system 21. Here, this shows an example where the pipe 8 in FIG. 3 is varied as the pipe 8 in the configuration of FIG. 1. The valve 22 is placed vertically above the second pipe 82 so that the condensed water of the second pipe 82 does not invade. Thus, the bad influence of the condensed water on the PEFC 23 can be removed.

An embodiment of the gas supplying method of the present invention will be described below with reference to FIG. 1.

The fuel and air for the combustion are supplied to the reformer 3 after the respective flow rates are adjusted by the flow rate adjusters 16c, 16d. The reformer 3 is heated to a predetermined temperature by the combustion of the fuel and air. The water (vapor) and fuel (fuel gas) for the reformed gas are supplied to the reformer 3 after the respective flow rates are adjusted by the flow rate adjusters 16a, 16b. The mixed raw material including the water and fuel (fuel gas) is reformed (vapor reforming) inside the reformer 3 and becomes the reformed gas. At that time, the controller 30 controls the flow rates of the fuel and air, which are supplied to the reformer 3 for the combustion, so that the output temperature T is controlled to a appropriate value, where the carbon conversion rate of the reformed gas generated by the reformer 3 remains in the predetermined range (for example, 90% or more), in accordance with the output temperature T of the reformer 3.

The reformed gas is cooled by the heat exchanger 4 and sent to the pressure rising pump 5. The condensed water generated when it is cooled is recovered by the drain recovery unit of the pipe 33. The reformed gas from the pipe 33 is mixed with the reformed gas from the pipe 36 joined to the pipe 33, and compressed from the pressure P1 (approximately equal to the atmospheric pressure) and sent to the buffer tank 6. At that time, the controller 30 controls the rotation number of the pressure rising pump 5 so that the pressure P1 is in the predetermined range (for example, approximate atmospheric pressure<P1<P2) and the pressure P2 is in the predetermined range (for example, P2>P3). The controller 30 controls the flow rates of the water and fuel, which are supplied to the reformer 3 for the reformed gas, so that the pressure P2 remains in the predetermined range (for example, P2>P3, P3 is constant), in accordance with the pressure P2 of the reformed gas after it is compressed by the pressure rising pump 5. The reformed gas of the buffer tank 6 is cooled. The condensed water generated when it is cooled is recovered by the drain recovery unit.

The reformed gas sent from the buffer tank 6 is decompressed from the pressure P2 to the pressure P3 by the decompressing valve 7. The reformed gas of the pressure P3 is sent to the pipe 8. The reformed gas is distributed from the first pipe 81 to the plurality of second pipes 82, decompressed by the throttle valve 51 and supplied to each of the plurality of fuel cell systems 21. The plurality of fuel cell systems 21 use the reformed gas and generate electric power. The remaining reformed gas, after arriving at the third pipe 83, circulates through the pipe 36 to the pressure rising pump 5. The condensed water generated in each of the plurality of second pipes 82 is recovered by the drain recovery unit.

The condensed water recovered by the drain recovery unit is collected through the pipe 31 or directly in the water tank 9. On the other hand, the raw material water is also collected through the pipe 31 in the water tank 9. They are supplied to the gas supplier 2 after the ion conductivities are adjusted in the ion exchange processing facility 10.

The combustion gas (off-gas) from the reformer 3, the part of the reformed gas from the pipe 33-pipe 38, and the part of the reformed gas relieved by the relief valve 14 from the pipe 37-pipe 38 are exhausted after they are burnt by the off-gas combustor 11 and made harmless.

According to the present invention, when the plurality of fuel cells are used in the predetermined region, the gas to be used as the fuel can be supplied to all of the plurality of fuel cells. Also, it is possible to prevent the pipe for the gas supply from being clogged and corrosive. Then, the common facility and the respective fuel cells can be stably operated.

Figure 11:
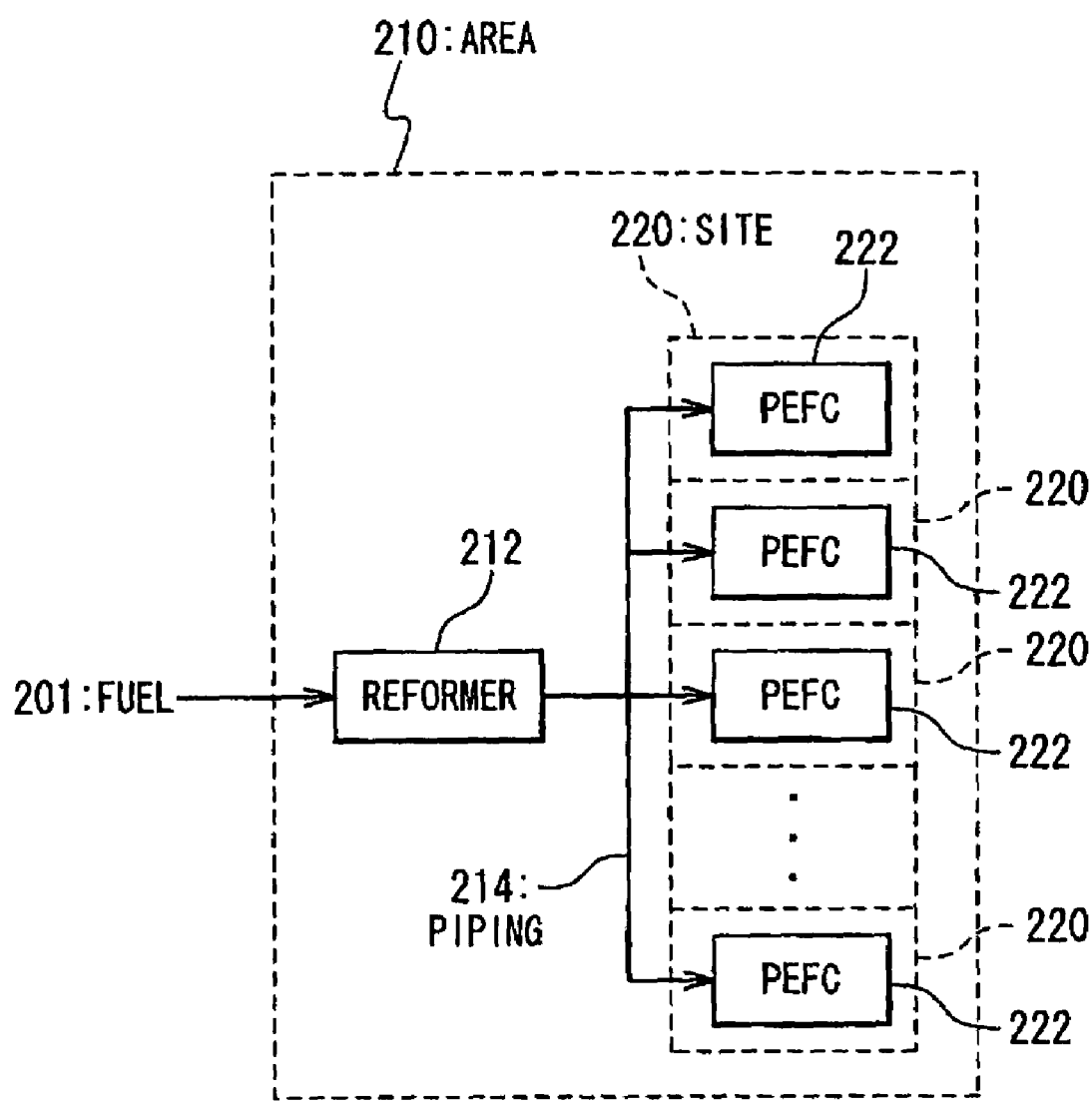
FIG. 11 is a diagrammatic view showing an embodiment of a cogeneration system according to the present invention.

Further embodiments of a gas supplying system, an energy supplying system and a gas supplying method of the present invention will be described below. FIG. 11 is a diagrammatic view showing the configuration of the cogeneration system including the gas supplying system, and FIG. 12 is a diagrammatic view showing the configuration in each site in FIG. 11.

As shown in FIG. 11, a area 210 having a plurality of sites 220 includes a reformer 212 that can generate reformed gas by reforming a hydrocarbon-based fuel such as town gas and the like, as a common facility. This reformer 212 can carry out the DSS operation by including, for example, a mechanism for purging the gas remaining therein through inactive gas at a time of stop and consequently avoiding the deterioration in the catalyst which is used. Each site 220 inside the area 210 includes one polymer electrolyte fuel cell (PEFC) 222. Moreover, a piping 214 for distributing the reformed gas produced by the reformer 212 to each PEFC 222 is laid in the area 210. As the number of the sites inside the area 210, for example, when the scale of 50 to 100 houses is assumed, with the reformer 212 as the large capacity of 50 to 100 kW, the assumption where the capacity of the PEFC 222 in each site 220 is defined as 1 kW is preferred from the viewpoint of the efficiency of the entire system. It is possible to cope with the demand site having a large amount of electric power consumption, by increasing the electricity generation capacity of the PEFC.

Figure 12:
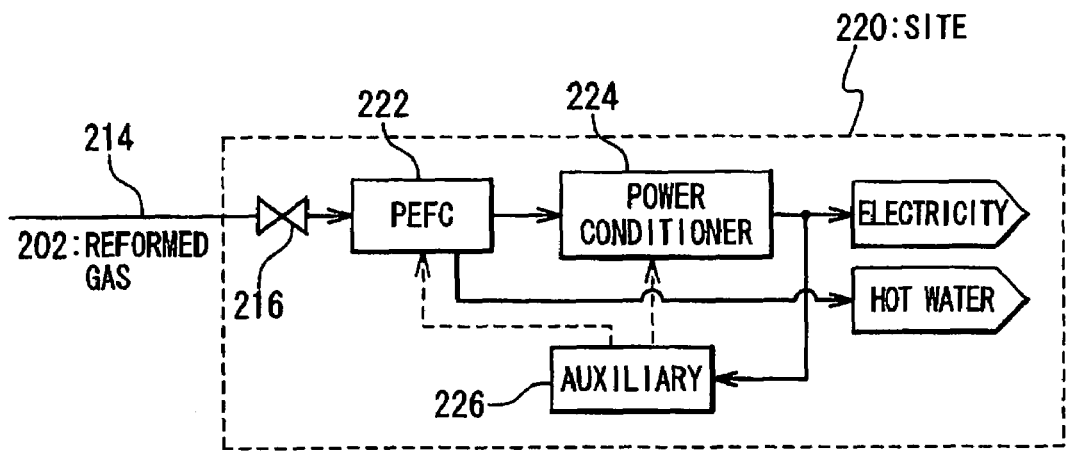
FIG. 12 is a diagrammatic view showing an embodiment of a configuration in each site.

As shown in FIG. 12, inside the site 220, a valve 16 is placed in the piping 214. In addition to the PEFC 222, a power conditioner 224 for converting a direct current power generated by the PEFC 222 into an alternating current power and a plurality of auxiliaries 226 required to operate the PEFC 222 and the power conditioner 224 are placed. The power conditioner 224 and the auxiliaries 226 are controlled by a controller (not shown) and the like.

According to the above mentioned configuration, when the DSS operation of the reformer 212 is started, a fuel 1 such as the town gas and the like is supplied to the reformer 212. The fuel is reformed by the reformer 212, and the reformed gas 202 is generated. The reformed gas 202 mainly has the dry composition although depending on the raw material of the fuel. Then, as the main components, a hydrogen ($H_2$) concentration is 70 to 80 mole percents, and a carbon dioxide ($CO_2$) concentration is 15 to 25 mole percents. Methane ($CH_4$), nitride ($N_2$) and the like are included as the remaining components. The reformed gas 202 further includes the water component close to the saturation state at its pressure and temperature. Thus, in order to condense the reformed gas 202 in the piping 214, it is preferred to extract the water components through a condenser (not shown) by cooling the reformed gas to an ordinary temperature. The reformed gas 202 is distributed through the piping 214 to the PEFC 222 of each site 220.

Next, at each site 220, the PEFC 222 is operated in response to each electricity demand or heat demand (hot water supply demand). In order to start the operation, the valve 216 placed in the piping 214 inside the site 220 is opened to introduce the reformed gas 202 into the PEFC 222. In order that the PEFC 222 generates the electric power of 1 kW, the flow amount of the hydrogen in the reformed gas 202 is desired to be in a range between about 0.8 and 0.9 $Nm^3/h$. The hydrogen of about 80 to 90% in the reformed gas 202 introduced into the PEFC 222 is consumed to carry out the electricity generation. The generated electric power is at the state of the direct current which can be supplied directly. Usually it is converted through the power conditioner 224 into the alternating current and used in each site. A part of the electricity is used in the auxiliaries 226. Also, the hot water is generated by the waste heat of the PEFC 222 and supplied.

An example of the operating method will be described below. When the reformed gas 202 is used in each site 220, the pressure of the reformed gas 202 inside the piping 214 is dropped. In response to this drop in the pressure, the reformer 212 produces the reformed gas 202, and supplies the reformed gas 202 to the piping 214, and the pressure inside the piping 214 is increased to a predetermined value. That is, the reformer 212 carries out the operation in response to the change in the pressure of the reformed gas 202 inside the piping 214. Since the change in the pressure inside the piping 214 results from the average of the changes in the sharp electric power demands of each site 220, it is very gentle as compared with the change in the electric power demand of each site 220.

The reformer 212 is desired to be stopped in the time band where the electric power demand or heat demand in each site 220 is low. In the time band until the reformer 212 is re-started, the electric power supplied from an electric power company is used. When it becomes in the time band where the demand in each site 220 is high, the fuel is introduced into the reformer 212 and the reformer is started again. In this way, the DSS operation is performed on the reformer 212 that is the common facility of the plurality of sites, and the PEFC is operated on each site 220.

Thus, the reformer 212 is placed as the common facility in the plurality of sites, and the reformed gas 202 is supplied through the piping 214 to each site 220. Thus, independently of the sharp change of the electric power demand of each site 220, the operation of the reformer 212 can be attained stably and efficiently. Also, the reformer 212 having the larger capacity can be used over the case of the installation in each site 220. Hence, with the larger output, the heat radiation loss rate can be reduced, thereby improving the reforming efficiency of the reformer 212.

Also, the facility cost can be largely reduced over the case where the reformer is placed in each site 220. In association with this, the individual maintenance works necessary for the monitoring of the reformer in each site, the evaluation for the presence or absence of the deterioration, the leakage detection of the reformed gas, the catalyst exchanging work and the like are integrated, which can largely drop the cost of the maintenance of the reformer.

Moreover, the reformed gas 202 is supplied through the piping 214 to each site 220, and only the required electric power amount is generated in each site 220 by the PEFC 222 set in each site 220. Thus, the generation of the excessive electric power can be suppressed. Also, in the system where the excessive hydrogen is consumed in each site 220, the reformed gas 202 can be supplied from the reformer 212 to the PEFC 222 by using a one-path method. Thus, the line to return the reformed gas containing the excessive hydrogen back to the reformer is not required, which can simplify the facility and reduce the point number of the auxiliaries 226 and the number of the control points. For example, since the point number of the auxiliaries 226 inside the site 220 is reduced, a house consumption rate (auxiliary power/electricity generation power) can be largely reduced.

The case where the single reformer 212 is placed is shown in FIG. 11. Further, a plurality of reformers 212 may be placed inside the area 10. According to such configuration, when the electric power demand inside the area 210 is maximum, all of the reformers are operated, and when the electric power demand is dropped, only the required number of the reformers is operated. Thus, the reforming efficiency can be improved over the case where the single reformer is operated under the partial load.

Also, when the reformer 212 is operated under the partial load, a reformed gas storage unit (not shown) can be placed in the piping 214, or an electric power storage unit (not shown) can be placed as the common facility of the plurality of sites. Thus, the load variation in the reformer 212 can be relaxed, thereby improving the reforming efficiency. As the reforming gas storage unit, for example, the storage unit which uses a hydrogen accumulation alloy or a carbon nano-tube can be used. Also, as the electric power storage unit, for example, an alkali secondary cell, a lithium-based secondary cell and the like can be used.

Figure 13:
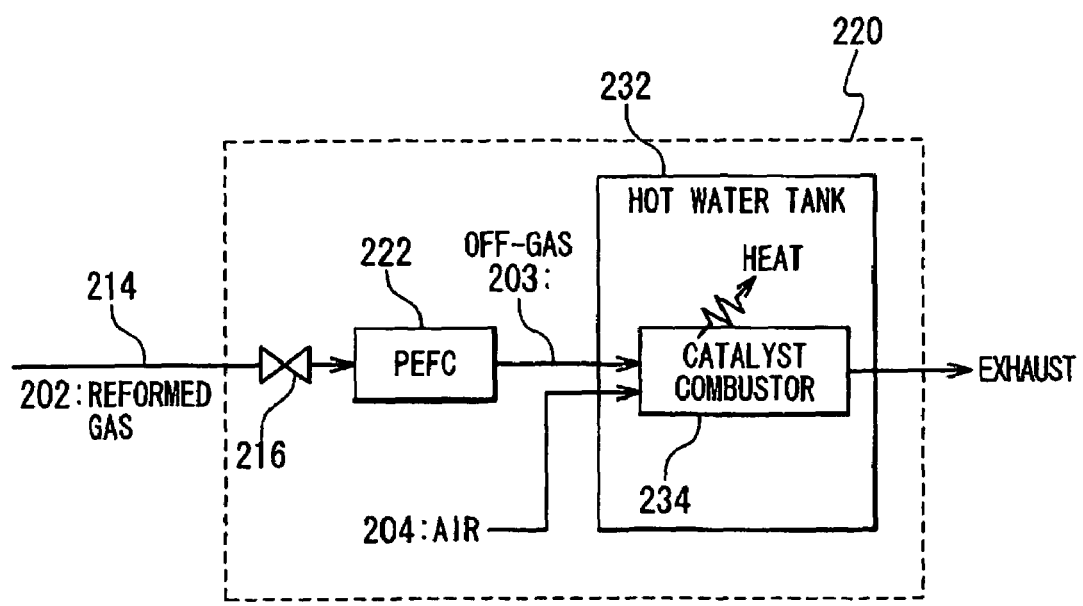
FIG. 13 is a diagrammatic view showing another embodiment of the configuration in each site.

FIG. 13 is a diagrammatic view showing the configuration inside each site in the cogeneration system. The configurations outside the site are assumed to be similar to those of FIG. 11. Also, the same symbols are given to the configurations similar to those of FIGS. 11, 12, and their detailed explanations are omitted.

As shown in FIG. 13, a catalyst combustor 34 is placed on an off-gas outlet of the PEFC 222 in each site 220. The combustion catalyst of the catalyst combustor 234 can burn hydrogen. The material of the catalyst is not especially limited. Preferably, the combustion catalyst where the noble metal exemplified by platinum is held by a carrier is used. Also, the catalyst combustor 234 is placed inside a hot water tank 232, and a heat exchanger (not shown) is placed for carrying out the heat exchange between the hot gas generated by the catalyst combustor 234 and the hot water inside the hot water tank 232. The power conditioner 224 and the auxiliaries 226 are also placed in each site 220, similarly to FIG. 12, although they are not shown in FIG. 13.

According to the configuration mentioned above, similarly to FIGS. 11, 12, the reformed gas 202 is introduced from the reformer into the PEFC 222. In the PEFC 222, the hydrogen of about 80 to 90% in the reformed gas 202 is consumed, and the electric power and the heat are generated. On the other hand, an off-gas 203 is discharged from a hydrogen electrode outlet of the PEFC. The flow amount of the hydrogen in the off-gas 203 is 0.08 to 0.18 $Nm^3/h$. The hydrogen concentration is about 35 to 45 mole percents in the dry composition. A combustion air 204 together with the off-gas 203 is introduced into the catalyst combustor 234. Simultaneously with the arrival at the combustion catalyst of the off-gas 203, the combustion is automatically started. The air 204 is preferred to be supplied such that a combustion temperature is in a proper range. The heat gas generated by the combustion is discharged from the site 220 after the hot water inside the hot water tank 232 is heated by the heat exchanger (not shown).

Thus, the installation of the catalyst combustor 234 for burning the off-gas 203 in the PEFC 222 enables the energy in the off-gas 203 to be effectively used, which can contribute to the reduction of the heat loss in the entire cogeneration system. Also, since the burning method of the off-gas 203 is assumed to be the catalyst combustion, the off-gas 203 can be burnt simply and stably without any problem of the difficulty of the ignition and the misfire.

By the way, the combustion temperature in the catalyst combustor 234 becomes different depending on the flow amount of the air 204. When it is burned in the situation where oxygen is not excessive or short, the combustion temperature is about 1300 to 1400 degrees centigrade. When the combustion temperature exceeds the heat-resistant temperature (about 700 to 800 degrees centigrade) of the catalyst, for example, the heat exchanger preferably has the configuration where a plate fin heat exchanger is employed and the combustion catalyst is coated on a fin surface. With such configuration, simultaneously with the generation of the combustion heat, it can be cooled and used to increase the temperature of the water of the hot water tank 232.

Figure 14:
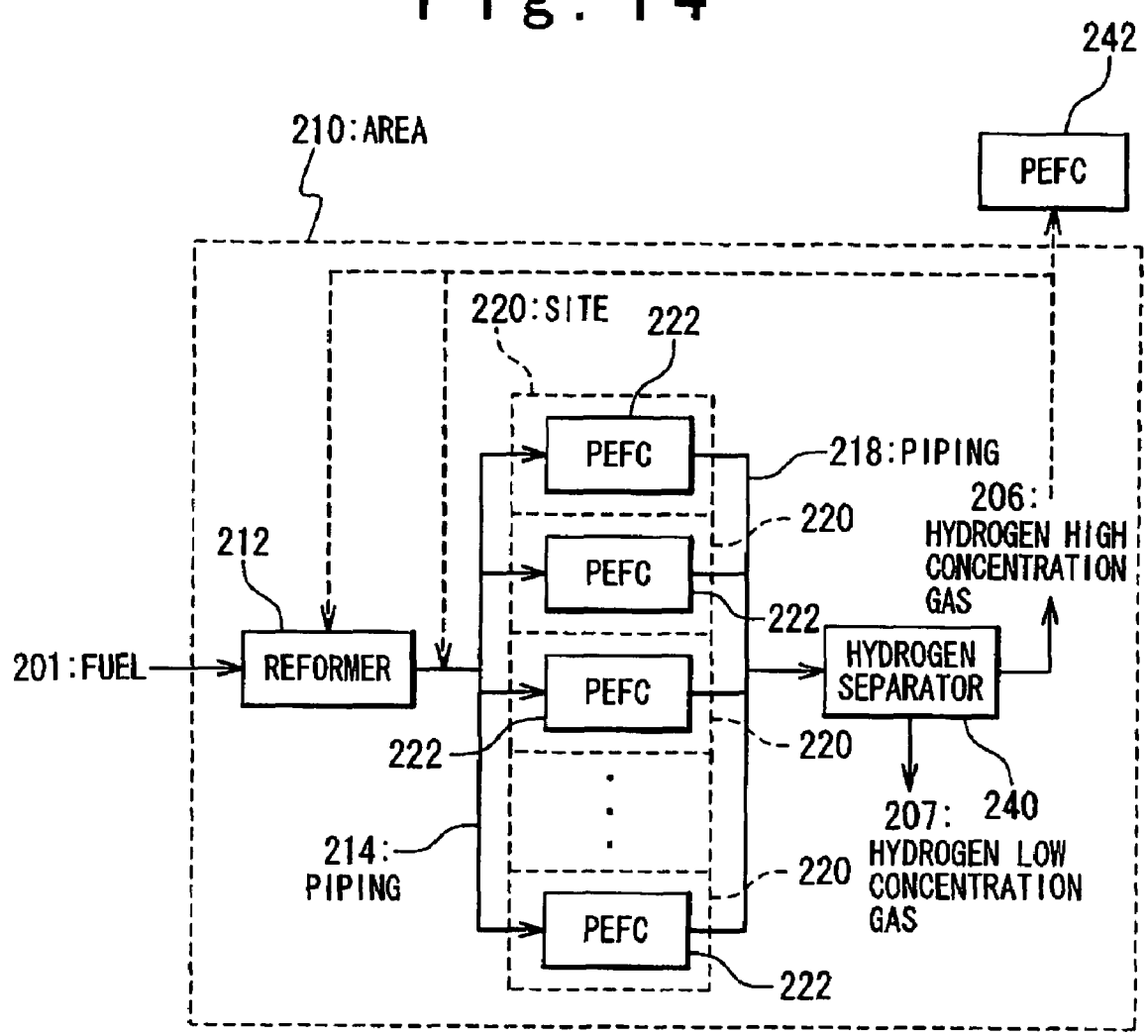
FIG. 14 is a diagrammatic view showing another embodiment of the configuration in each site.

FIG. 14 is a diagrammatic view showing the cogeneration system. The same symbols are given to the configurations similar to FIG. 11, and their detailed explanations are omitted.

As shown in FIG. 14, a hydrogen separator 240 as the common facility is placed inside the area 210. Then, a piping 218 is placed for collecting the off-gas 203 from the PEFC 222 in each site 220 and supplying to the hydrogen separator 240. As the hydrogen separator 240, the apparatus using a hydrogen separation film or an apparatus using a pressure swing absorption (PSA) method can be adopted. As the hydrogen separation film, it is preferred to use the metal or alloy that selectively transmits the hydrogen, such as a palladium (Pd) metal, a Pd-based alloy or the like.

Also, as the apparatus for using the PSA method, the absorber absorbing an impurity other than the hydrogen in the off-gas such as zeolite and the like can be preferably applied.

According to the configurations as mentioned above, the off-gas 203 generated in each site 220 is collected and introduced through the piping 218 into the hydrogen separator 240. The hydrogen concentration of the off-gas 203 is about 35 to 45 weight percents under the dry base. The hydrogen separator 240 separates the hydrogen from the off-gas 203. The hydrogen high concentration gas 206 whose hydrogen concentration is, for example, 99 mole percents or more and a hydrogen low concentration gas 207 whose hydrogen concentration is, for example, 1 mole percents or less are generated. With a pump (not shown), the hydrogen high concentration gas 206 is again returned to the piping 214 on the upstream side of the PEFC 222 and circulated therein, and it is used as the heat source of the reformer 212 or supplied to another PEFC 242, and the electricity is generated.

Thus, since the hydrogen separator 240 is placed in the off-gas outlet of the PEFC 222, the hydrogen can be separated from the off-gas 203 so that the hydrogen high concentration gas 206 which can be used in various usages can be generated. Thus, the re-use of the hydrogen can be impelled, thereby improving the efficiency of the entire cogeneration system.

The configuration shown in FIG. 14 is desired from the viewpoint that the hydrogen separator 240 is used as the common facility in the plurality of sites so that the facility cost can be reduced.

Also, in the configuration shown in FIG. 14, the hydrogen high concentration gas 206 is introduced into the PEFC 242 outside the area 210. However, it can be supplied to a different hydrogen consumption facility other than the facility using the PEFC.

Figure 15:
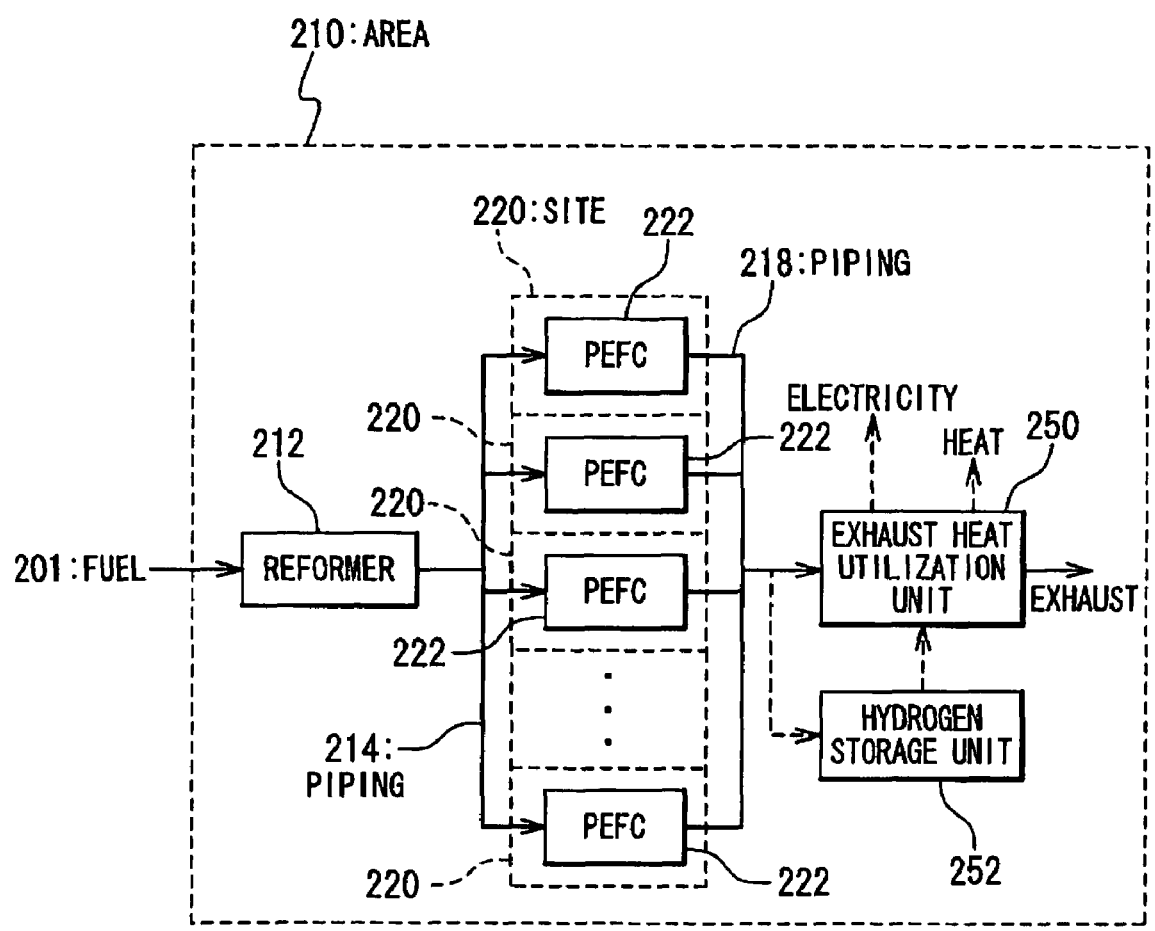
FIG. 15 is a diagrammatic view showing another embodiment of the system.

FIG. 15 is a diagrammatic view showing the cogeneration system. The same symbols are given to the configurations similar to FIG. 11, and their detailed explanations are omitted.

As shown in FIG. 15, an exhaust heat utilization unit 250 as the common facility is placed inside the area 210. The piping 218 is placed for collecting the off-gas 203 from the PEFC 222 in each site 220 and supplying to the exhaust heat utilization unit 250. A combustor (not shown) for burning the off-gas 203 is jointly placed in the exhaust heat utilization unit 250. The combustion gas burnt in the combustor is supplied to the exhaust heat utilization unit 250. As the exhaust heat utilization unit 250, the electricity generation apparatus such as a gas turbine, a gas engine and the like, the cold heat generator such as an absorption refrigerator and the like, or the combination of them are preferably exemplified. Also, as the combustor, the catalyst combustor explained in FIG. 13 is preferably used, although it is not limited thereto.

The ability of the exhaust heat utilization unit 250 is preferred to be designed depending on the scale of the number of the sizes in the area 210. When the electricity generator is used as the exhaust heat utilization unit 250, for example, if the scale between 50 and 100 houses is assumed as the number of the sites inside the area 210, the design of the electricity generation ability of 10 to 50 kW is preferred from the viewpoint of the efficiency of the entire system. Also, it becomes the similar scale even in the case of the cold heat generator.

According to the configuration as mentioned above, the off-gas 203 generated in each site 220 is collected through the piping 218 to the exhaust heat utilization unit 250 and burned in the combustor (not shown) and then introduced into the exhaust heat utilization unit 250. The off-gas 203 including the hydrogen of about 35 to 45 mole percents in the dry composition becomes the combustion gas at the high temperature such as about 1300 to 1400 degrees centigrade through the combustion. Then, with this combustion heat as the heat source, the electricity, heat and cold heat are generated in the exhaust heat utilization unit 250. The generated electricity, heat and cold heat may be supplied to the common facility and shops inside the area 210, or supplied to each site 220, or further supplied outside the area 210.

Thus, by installing the exhaust heat utilization unit 250 in the off-gas outlet of the PEFC 222, the energy such as the electricity, heat, cold heat and the like can be generated from the off-gas 203 including the excessive hydrogen. Hence, the hydrogen can be effectively used, thereby improving the efficiency of the entire cogeneration system.

Also, it is possible that the whole of the off-gas 203 is not supplied to the exhaust heat utilization unit 250, and only a part of the off-gas 203 is supplied to a hydrogen storage unit 252. As the hydrogen storage unit 252, the apparatus that uses a hydrogen absorption alloy, a carbon nano-tube and the like can be used. According to such configuration, even if the off-gas 203 of the amount exceeding the ability of the exhaust heat utilization unit 250 is supplied from the site 220, the hydrogen storage unit 252 can store the hydrogen in the off-gas 203. The efficiency of the entire system is improved. Also, the hydrogen stored in the hydrogen storage unit 252 can be used as the fuel of the exhaust heat utilization unit 250 together with the off-gas 203. Also, it can be supplied to the other facility that uses the hydrogen. It is also preferably that a hydrogen separator (not shown) is jointly placed in the hydrogen storage unit 252, and the concentration of the hydrogen in the off-gas 203 is made higher in the hydrogen separator, and it can be supplied to the hydrogen storage unit 252.

Although the exhaust heat utilization unit 250 is single in FIG. 15, it is also preferable to place a plurality of exhaust heat utilization unit 250 in the area 210. Also, although the exhaust heat utilization unit 250 can be placed in each site 220, the design of the common facility in the plurality of sites 220 is desired from the viewpoint of the reduction of the facility cost. Also, in addition to the joint placement of the combustor in the exhaust heat utilization unit 250, the combustor is placed in each site 220, and the combustion gas can be supplied from each site 220 through the piping 218 to the exhaust heat utilization unit 250.

Figure 16:
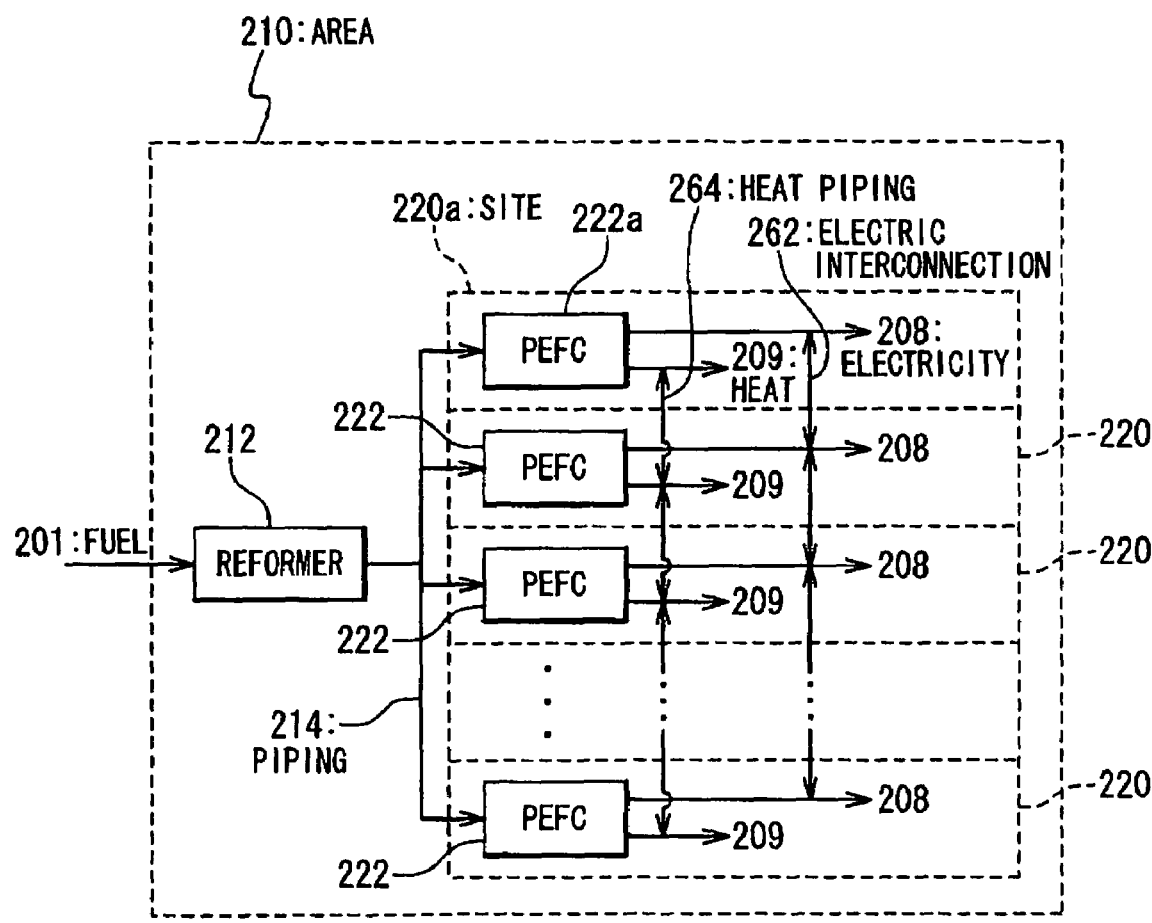
FIG. 16 is a diagrammatic view showing another embodiment of the system.

FIG. 16 is a diagrammatic view showing the cogeneration system. The same symbols are given to the configurations similar to FIG. 11, and their detailed explanations are omitted.

As shown in FIG. 16, an electric interconnection 262 is laid in order that an electricity 208 generated in the PEFC 222 in each site 220 is supplied mutually between the respective sites 220. Also similarly, a heat piping 264 is placed in order that a heat (hot water) 9 generated in the PEFC 222 is supplied mutually between the respective sites 220. In FIG. 16, both of the electric interconnection 262 and the heat piping 264 are laid. Either the electric interconnection 262 or the heat piping 264 can be independently used.

According to the configuration as mentioned above, by the operation of the PEFC 222a in a certain site 220a, the electricity 208 and the heat (hot water) 9 are generated at the same time. If the whole of the generated electricity 208 and heat 209 is not required in the site 220a, the excessive electricity 208 or heat 209 exists in the site 220a. For example, if the electric power is mainly required in the site 220, the heat 209 is excessive, and if the hot water is mainly used, the electricity 208 is excessive. This excessive electricity 208 or heat 209 is supplied through the electric interconnection 262 or heat piping 264 to a different site 220. Thus, since the excessive electricity 208 and heat 209 can be used by the different site 220, the energy can be effectively used, which enables the efficient energy supply even under the condition that the electric power demand and heat demand in the entire site varies.

Figure 17:
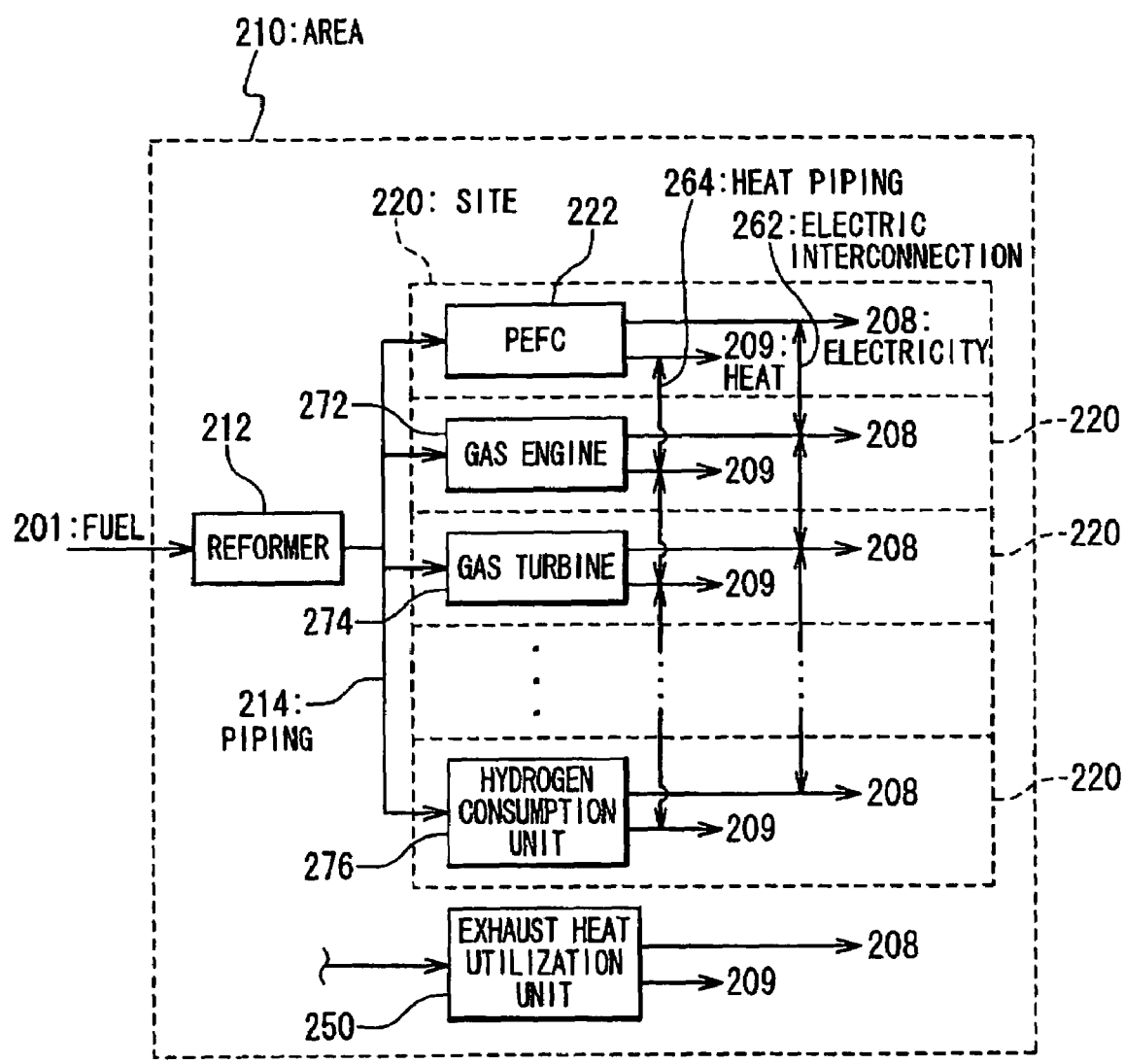
FIG. 17 is a diagrammatic view showing another embodiment of the system.

In FIG. 16, the case where the electric interconnection 262 and the heat piping 264 are placed between the respective sites 220 is shown. However, the place where the electric interconnection 262 and the heat piping 264 is laid is not limited between the sites 220. As shown in FIG. 17, in addition to the site 220, even between it and the exhaust heat utilization unit 250 that is the above-mentioned common facility, the electric interconnection 262 and the heat piping 264 can be placed to mutually supply the electricity 208 and the heat 209. Thus, it is possible to attain the higher efficiency of the entire cogeneration system. Also, FIG. 16 shows the case where the electricity generation apparatus in the site 220 is the PEFC 222. However, this is not limited to the PEFC. As shown in FIG. 17, even if a gas engine 72, a gas turbine 74 and a different hydrogen consumption apparatus 76 are placed in the site 220, the mutual supply of the electricity 208 and the heat 209 can be similarly attained.

FIG. 18 is a diagrammatic view showing another embodiment of the cogeneration system according to the present invention. By the way, the same symbols are given to the configurations similar to FIG. 11, and their detailed explanations are omitted.

As shown in FIG. 18, a reformed gas storage unit 282 for transiently storing the reformed gas generated in the reformer 212 is placed as the common facility inside the area 210. The piping 214 for distributing and supplying the reformed gas to the PEFC 222 in each site 220 is connected to this reformed gas storage unit 282. The ability of the reformed gas storage unit 282 can be designed depending on the scale of the number of the sites inside the area 210. For example, when the scale between 50 and 100 houses is assumed as the number of the sites inside the area 210, preferably, the pressure at which the reformed gas is compressed is defined as about 5 to 10 ata, and the capacity of a tank in which the reformed gas is filled is assumed as 10 to 15 m³.

According to the foregoing configuration, the reformed gas generated in the reformer 212 is supplied to the reformed gas storage unit 282. The reformed gas storage unit 282 compresses a part of the reformed gas 202 under arbitral pressure and transiently stores it. When the consumption quantity of the reformed gas in the entire site 220 is increased, the pressure of the reformed gas inside the piping 214 is dropped. In response to this drop in the pressure, the reformed gas stored in the reformed gas storage unit 282 is supplied through the piping 214 to the site 220. In this way, the variation in the demand amount of the reformed gas in the entire site 220 is coped with by storing and supplying the reformed gas in the reformed gas storage unit 282. Hence, the reformer 212 can be operated stably and efficiently.

Also, as shown in FIG. 18, a hydrogen separator 284 is preferably installed between the reformer 212 and the reformed gas storage unit 282. As the hydrogen separator 284, it is possible to use the apparatus that uses the hydrogen separation film and the apparatus that uses the pressure swing absorption (PSA) method, similarly to the foregoing explanations. According to such configuration, the reformed gas generated in the reformer 212 is stored in the reformed gas storage unit 282 after the component other than the hydrogen is separated by the hydrogen separator 284 and then the hydrogen concentration becomes high. Thus, the hydrogen can be efficiently stored which increases the hydrogen storage amount in the reformed gas storage unit 282. Thus, the reformer 212 can be operated stably and efficiently. Also, since the hydrogen can be efficiently stored, the reformed gas storage unit 282 can be made compact. For example, in the case of the same condition as the foregoing explanation, the capacity of the tank can be set at 7 to 10 m³.

In FIGS. 11 to 18, as the fuel cell installed in each site 220, the polymer electrolyte fuel cell (PEFC) 22 is shown. However, the fuel cell such as a phosphoric acid type, an alkali type, a molten carbonate type, a solid oxide type and the like can be used. The type of the fuel cell is selected depending on the electric power demand of the site.

As mentioned above, according to the present invention, this intends to provide the cheap cogeneration system that can prevent the generation of excessive electric power and heat, in each home of the apartment houses and the area where the plurality of sites, such as the detached houses, offices, hospitals, schools and the like are built.

What is claimed is:

1. A gas supplying system comprising:
   a reformer generating a reformed gas by reforming a mixed raw material including a fuel and a first water; and
   a piping network distributing said reformed gas to a plurality of fuel cell systems, wherein the reformed gas is recovered from the fuel cell systems in the piping network and the recovered reformed gas is circulated back to the fuel cell systems through the piping network.

2. The gas supplying system according to claim 1,
   wherein said piping network has a circulating route for distributing said reformed gas to said plurality of fuel cell systems.

3. The gas supplying system according to claim 1, further comprising:
   a drain recovery unit recovering a second water condensed from said reformed gas in said piping network.

4. The gas supplying system according to claim 3,
   wherein said piping network has a circulating route for distributing said reformed gas to said plurality of fuel cell systems.

5. The gas supplying system according to claim 3,
   wherein said piping network includes:
   a pump which raise a pressure of said reformed gas supplied from said reformer;
   an outward piping network which distributes said reformed gas supplied through said pump to said plurality of fuel cell systems; and
   a homeward piping network which recovers said reformed gas distributed by said outward piping network and circulates a recovered said reformed gas to said pump.

6. The gas supplying system according to claim 5,
   wherein said outward piping network includes:
   a plurality of distribution pipes forming a plurality of bifurcations of a distribution route; and
   a plurality of valves respectively inserted in said plurality of distribution pipes and prevent said reformed gas from running reversely.

7. The gas supplying system according to claim 5,
   Wherein said outward piping network includes a distribution pipe forming a distribution route without any bifurcation.

8. The gas supplying system according to claim 6,
   wherein said distribution route is connected to said drain recovery unit.

9. The gas supplying system according to claim 8,
   wherein said distribution route slopes to a horizontal plane for said second water flowing towards a portion connecting with said drain recovery unit.

10. The gas supplying system according to claim 5, further comprising a controlling unit controlling an operation condition of said reformer, for a pressure of said reformed gas after pressurized by said pump being within a predetermined range.

11. The gas supplying system according to claim 10,
    wherein said operation condition includes a flow rate of said mixed raw material supplied to said reformer.

12. The gas supplying system according to claim 10,
    wherein said controlling unit controls said operation condition for a conversion rate of a carbon in said reformed gas being over a predetermined value.

13. The gas supplying system according to claim 12,
    wherein said operation condition includes a flow rate of a gas for combustion supplied to said reformer.

14. The gas supplying system according to claim 10,
    wherein said controlling unit controls a operation condition of said pump so that a pressure of said reformed gas is within a predetermined range and a pressure of said reformed gas after pressurized by said pump is within a predetermined range.

15. The gas supplying system according to claim 14,
    wherein said operation condition of said pump includes a revolution speed.

16. The gas supplying system according to claim 3,
    wherein said piping network includes a plurality of pipes, and
    at least one of said plurality of pipes has a lowest point where a vertical height is local minimum, and
    said drain recovery unit is connected in said lowest point.

17. The gas supplying system according to claim 1, further comprising:
    said plurality of fuel cell systems installed in at least one building.

18. The gas supplying system according to claim 1,
wherein said reformer is a common facility of a plurality of sites, and
each of said fuel cell systems is installed in one of said plurality of sites and has a heat supplying system for supplying a heat and an electricity supplying system for supplying an electricity.

19. The gas supplying system according to claim 18, further comprising:
a catalyst combustor which supplies a heat generated by a catalyst combustion of an off-gas exhausted from said fuel cell systems.

20. The gas supplying system according to claim 19, further comprising:
a tank for reserving a water heated by a heat supplied by said catalyst combustor.

21. The gas supplying system according to claim 18, further comprising:
a hydrogen separator which extracts a hydrogen component from an off-gas exhausted from said fuel cell systems.

22. The gas supplying system according to claim 21, wherein said hydrogen separator separates said hydrogen component by using a hydrogen separation film.

23. The gas supplying system according to claim 21, wherein said hydrogen separator separates said hydrogen component by using a pressure swing absorption method.

24. The gas supplying system according to claim 18, further comprising:
an exhaust heat utilization unit which produces a heat medium having a temperature different from an environment by using an energy obtained by combusting an off-gas exhausted from said fuel cell systems.

25. The gas supplying system according to claim 18, further comprising:
an exhaust heat utilization unit which generates an electricity by using an energy obtained by combusting an off-gas exhausted from said fuel cell systems.

26. The gas supplying system according to claim 18, further comprising:
a mutual supplying network which connects a plurality of selected sites selected from said plurality of sites to supply an energy mutually.

27. The gas supplying system according to claim 24, further comprising:
a mutual supplying network,
wherein said exhaust heat utilization unit is installed in a first site selected from said plurality of sites, and said mutual supplying network connects said exhaust heat utilization unit and one of said plurality of fuel cell systems installed in a second site to supply an energy mutually.

28. The gas supplying system according to claim 25, further comprising:
a mutual supplying network,
wherein said exhaust heat utilization unit is installed in a first site selected from said plurality of sites, and said mutual supplying network connects said exhaust heat utilization unit and one of said plurality of fuel cell systems installed in a second site to supply an energy mutually.

29. The gas supplying system according to claim 18, further comprising:
a buffer tank inserted between said reformer and each of said plurality of sites for reserving said reformed gas generated by said reformer temporarily.

30. The gas supplying system according to claim 29, further comprising:
a hydrogen separator inserted between said reformer and said buffer tank for extracting a hydrogen component from said reformed gas generated by said reformer.

31. A gas supplying method comprising the steps of:
(a) generating a reformed gas by reforming a raw material including a fuel and a first water in a reformer;
(b) pressurizing said reformed gas;
(c) distributing said pressurized reformed gas through an outward piping network to a plurality of fuel cells;
(d) recovering said reformed gas which flowed said outward piping network through a homeward piping network; and
(e) supplying said recovered reformed gas to a pump.

32. The gas supplying method according to claim 31, wherein said step (a) includes the steps of:
(a1) measuring a first pressure of said reformed gas after pressurized by said pump; and
(a2) controlling an operation condition of said reformer in response to said first pressure for said first pressure being within a predetermined range.

33. The gas supplying method according to claim 31, wherein said step (a) includes the steps of:
(a3) measuring an outlet temperature of said reformed gas at an outlet of a reforming catalytic layer of said reformer; and
(a4) controlling an operation condition of said reformer in response to said outlet temperature for a conversion rate of carbon in said reformed gas being more than a predetermined value.

34. The gas supplying method according to any of claim 31, wherein said step (b) includes the steps of:
(b1) measuring a third pressure of said reformed gas after pressurized by said pump; and
(b2) controlling an operation condition of said pump in response to said third pressure so that a forth pressure of said reformed gas before pressurized is within a predetermined range, and said third pressure is within a predetermined range.

35. The gas supplying system according to claim 1, further comprising:
an off-gas combustor for burning reformed gas not sent to the fuel cell systems from the reformer.

* * * * *